US010160442B2

(12) United States Patent
Higashitani et al.

(10) Patent No.: US 10,160,442 B2
(45) Date of Patent: Dec. 25, 2018

(54) CONTROL DEVICE FOR HYBRID VEHICLE

(71) Applicant: DENSO CORPORATION, Kariya, Aichi-pref. (JP)

(72) Inventors: Mitsuharu Higashitani, Kariya (JP); Tsuyoshi Okamoto, Kariya (JP); Noriaki Ikemoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/518,889

(22) PCT Filed: Dec. 11, 2015

(86) PCT No.: PCT/JP2015/006185
§ 371 (c)(1),
(2) Date: Apr. 13, 2017

(87) PCT Pub. No.: WO2016/098327
PCT Pub. Date: Jun. 23, 2016

(65) Prior Publication Data
US 2017/0240162 A1    Aug. 24, 2017

(30) Foreign Application Priority Data

Dec. 19, 2014  (JP) ................................. 2014-257979

(51) Int. Cl.
*B60L 9/00*    (2006.01)
*B60W 20/13*   (2016.01)
(Continued)

(52) U.S. Cl.
CPC ............... *B60W 20/13* (2016.01); *B60K 6/20* (2013.01); *B60L 1/003* (2013.01); *B60L 1/02* (2013.01);
(Continued)

(58) Field of Classification Search
CPC ...... B60W 20/13; B60W 10/06; B60W 10/08; B60W 10/26; B60W 30/18072;
(Continued)

(56) References Cited

U.S. PATENT DOCUMENTS

2010/0029436 A1*  2/2010  Katsuta ..................... B60K 6/36
                                                  477/5
2014/0180517 A1*  6/2014  Endo ................. B60W 20/1062
                                                   701/22

(Continued)

FOREIGN PATENT DOCUMENTS

JP    2004-147460    5/2004
JP    2005-045883    2/2005
(Continued)

*Primary Examiner* — Shardul D Patel
(74) *Attorney, Agent, or Firm* — Nixon & Vanderhye PC

(57) ABSTRACT

For a hybrid vehicle including: an engine and a motor, each of which is mounted as a driving source; a generator driven by the engine; a high-voltage battery and a low-voltage battery, each of which can be charged and discharged; a converter connected between the high-voltage battery and the low-voltage battery; and an auxiliary load that consumes electric power supplied from the high-voltage battery via the converter or electric power supplied from the low-voltage battery, a control device includes a control unit that executes converter limit control that stops the converter or reduces output of the converter when a state of charge of the high-voltage battery is lower than or equal to a predetermined threshold.

10 Claims, 12 Drawing Sheets

(51) Int. Cl.
  *B60L 11/14* (2006.01)
  *B60W 10/26* (2006.01)
  *B60W 20/00* (2016.01)
  *B60K 6/20* (2007.10)
  *B60L 1/00* (2006.01)
  *B60L 1/02* (2006.01)
  *B60L 11/18* (2006.01)
  *B60L 15/00* (2006.01)
  *B60W 10/06* (2006.01)
  *B60W 10/08* (2006.01)
  *B60W 30/18* (2012.01)
  *B60L 15/20* (2006.01)

(52) U.S. Cl.
  CPC .......... *B60L 11/14* (2013.01); *B60L 11/1861* (2013.01); *B60L 11/1868* (2013.01); *B60L 15/007* (2013.01); *B60L 15/2045* (2013.01); *B60W 10/06* (2013.01); *B60W 10/08* (2013.01); *B60W 10/26* (2013.01); *B60W 20/00* (2013.01); *B60W 30/18072* (2013.01); B60L 2210/10 (2013.01); B60W 2510/244 (2013.01); B60W 2710/244 (2013.01); B60Y 2200/92 (2013.01); Y02T 10/645 (2013.01); Y02T 10/70 (2013.01); Y02T 10/7005 (2013.01); Y02T 10/7044 (2013.01); Y02T 10/7066 (2013.01); Y02T 10/7077 (2013.01); Y02T 10/7216 (2013.01); Y02T 10/7283 (2013.01); Y10S 903/93 (2013.01)

(58) Field of Classification Search
  CPC ...... B60W 2510/244; B60W 2710/244; B60K 6/20; B60L 1/02; B60L 11/1861; B60L 15/007; B60L 2210/10; B60Y 2200/92; Y10S 903/93
  USPC .................. 701/22; 180/65.245; 903/930, 93
  See application file for complete search history.

(56) References Cited

U.S. PATENT DOCUMENTS

| | | | | |
|---|---|---|---|---|
| 2014/0214251 | A1* | 7/2014 | Sugiyama | B60W 20/00 701/22 |
| 2015/0210173 | A1* | 7/2015 | Funabashi | B60L 11/1809 307/10.1 |
| 2015/0298701 | A1* | 10/2015 | Suzuki | B60W 10/06 701/48 |

FOREIGN PATENT DOCUMENTS

| | | |
|---|---|---|
| JP | 2007-302129 | 11/2007 |
| JP | 4079077 | 2/2008 |
| JP | 2014-083898 | 5/2014 |
| JP | 2014-138536 | 7/2014 |
| WO | WO 2014/068724 | 5/2014 |

\* cited by examiner

CONTROL DEVICE FOR HYBRID VEHICLE

CROSS REFERENCE TO RELATED APPLICATION

This application is the U.S. national phase of International Application No. PCT/JP2015/006185 filed on Dec. 11, 2015 which designated the U.S. and claims priority to Japanese Patent Application No. 2014-257979 filed on Dec. 19, 2014, the entire contents of each of which are hereby incorporated by reference.

TECHNICAL FIELD

The present disclosure relates to a control device for a hybrid vehicle having an engine and a motor as a drive source of the vehicle.

BACKGROUND ART

In recent years, a hybrid vehicle equipped with an engine and a motor as driving sources of the vehicle has attracted attention due to societal demands for fuel-efficient, low-emission vehicles. Some of such hybrid vehicles are adapted to perform deceleration regeneration of converting kinetic energy of the vehicle into electric energy and collecting (charging) the energy in a high-voltage battery at the time of deceleration of the vehicle (such as when an accelerator is released) to thus have extended time for which the vehicle can perform EV drive and increased fuel efficiency, the EV drive allowing the vehicle to run while being driven by rotation of the motor using the electric energy. However, a loss is generated during electric power generation (and discharging performed on EV drive) at the time of deceleration regeneration, so that deceleration regeneration may not be the most effective way to increase the fuel efficiency depending on the conditions.

What is favorable in terms of fuel efficiency is coasting drive (coasting drive in a neutral state) on which the kinetic energy and potential energy of the vehicle can be directly used for running, where the engine may be stopped during the coasting drive to be able to eliminate fuel consumption and a friction loss of the engine and have increased fuel efficiency.

Patent Literature 1 discloses a technique of increasing fuel efficiency of the hybrid vehicle, for example. Torque assist of a motor is used to perform vehicle speed control of controlling the vehicle speed such that the vehicle speed is maintained or that deceleration is decreased when an accelerator pedal is released, at which time there is selected either vehicle speed maintaining control or deceleration control at predetermined deceleration on the basis of a state of charge of a battery.

PRIOR ART LITERATURES

Patent Literature

Patent Literature 1: JP 4079077 B

SUMMARY OF INVENTION

While fuel efficiency can be increased by stopping the engine during the coasting drive, the stopping of the engine causes a generator driven by the engine to stop to thus stop electric power generation, so that a state of charge (SOC) of a high-voltage battery is decreased due to electric power consumed by an auxiliary load and possibly reaches an allowable lower limit at an early stage. When the SOC of the high-voltage battery reaches the allowable lower limit, the engine needs to be forcibly brought into operation to drive the generator and charge the high-voltage battery. However, the forcible operation of the engine during the coasting drive results in inefficient running of the engine and causes fuel efficiency to decrease accordingly, whereby the effect of increased fuel efficiency achieved by the coasting drive cannot be enhanced sufficiently.

An object of the present disclosure is to provide a control device for a hybrid vehicle, which inhibits a decrease in the state of charge of the high-voltage battery during the coasting drive to be able to inhibit degradation in fuel efficiency due to a forcible operation of the engine and enhance the effect of increased fuel efficiency achieved by the coasting drive.

According to an aspect of the present disclosure, for a hybrid vehicle including: an engine and a motor, each of which is mounted as a driving source; a generator driven by the engine; a high-voltage battery and a low-voltage battery, each of which is able to be charged and discharged; a converter connected between the high-voltage battery and the low-voltage battery; and an auxiliary load that consumes electric power supplied from the high-voltage battery via the converter or electric power supplied from the low-voltage battery, a control device includes a control unit that executes converter limit control that stops the converter or reduces output of the converter when a state of charge of the high-voltage battery is lower than or equal to a predetermined threshold.

According to the configuration, it is determined that the state of charge (SOC) of the high-voltage battery is highly likely to reach the allowable lower limit when the SOC of the high-voltage battery equals the threshold or lower, whereby the converter limit control is executed to stop the converter or reduce the output of the converter. As a result, the electric power supplied from the high-voltage battery via the converter is stopped or reduced to be able to inhibit the decrease in the state of charge of the high-voltage battery.

Accordingly, when the engine is stopped during the coasting drive, the SOC of the high-voltage battery does not reach the allowable lower limit to thus be able to avoid the forcible operation of the engine and avoid degradation in fuel efficiency caused by the forcible operation of the engine. Alternatively, when the engine is stopped during the coasting drive, the time it takes for the SOC of the high-voltage battery to reach the allowable lower limit is extended to be able to shorten the duration of the forcible operation of the engine (or extend the duration for which the engine is stopped) and thus reduce the degradation in fuel efficiency caused by the forcible operation of the engine. As a result, the effect of increased fuel efficiency achieved by the coasting drive can be enhanced.

According to an aspect of the present disclosure, for a hybrid vehicle including: an engine and a motor, each of which is mounted as a driving source; a generator driven by the engine; a high-voltage battery and a low-voltage battery, each of which is able to be charged and discharged; a converter connected between the high-voltage battery and the low-voltage battery; and a plurality of auxiliary loads, each of which consumes electric power supplied from the high-voltage battery via the converter or electric power supplied from the low-voltage battery, a control device includes a control unit that executes auxiliary load limit control that stops at least one of the plurality of auxiliary loads or reduces electric power consumption of at least one of the plurality of auxiliary loads when a state of charge of the high-voltage battery is lower than or equal to a predetermined threshold during execution of a power transmission interruption function by which power transmission between the driving source and a drive wheel is interrupted.

According to the configuration, it is determined that the SOC of the high-voltage battery is highly likely to reach the allowable lower limit when the SOC of the high-voltage battery equals the threshold or lower during the execution of the power transmission interruption function (such as during the coasting drive), whereby the auxiliary load limit control is executed to stop at least one of the plurality of auxiliary loads or reduce the electric power consumption of at least one of the plurality of auxiliary loads. As a result, the electric power supplied from the high-voltage battery via the converter is stopped or reduced to be able to inhibit the decrease in the state of charge of the high-voltage battery and obtain the effect substantially similar to that of the aforementioned aspect.

According to an aspect of the present disclosure, for a hybrid vehicle including: an engine and a motor, each of which is mounted as a driving source; a generator driven by the engine; a high-voltage battery and a low-voltage battery, each of which is able be charged and discharged; a converter connected between the high-voltage battery and the low-voltage battery; and an auxiliary load that consumes electric power supplied from the high-voltage battery via the converter or electric power supplied from the low-voltage battery, a control device includes: a calculation unit that calculates predicted duration as well as a predicted lower limit reaching time during execution of a power transmission interruption function by which power transmission between the driving source and a drive wheel is interrupted, the predicted duration being a predicted value of time it takes for the execution of the power transmission interruption function to end, and the predicted lower limit reaching time being a predicted value of time it takes for a state of charge of the high-voltage battery to reach an allowable lower limit; and a control unit that executes converter limit control that stops the converter or reduces output of the converter when the predicted duration is longer than the predicted lower limit reaching time.

According to the configuration, it is determined that the SOC of the high-voltage battery is highly likely to reach the allowable lower limit when the predicted duration is longer than the predicted lower limit reaching time during the execution of the power transmission interruption function (such as during the coasting drive), whereby the converter limit control is executed to stop the converter or reduce the output of the converter. As a result, the electric power supplied from the high-voltage battery via the converter is stopped or reduced to be able to inhibit the decrease in the state of charge of the high-voltage battery and obtain the effect substantially similar to that of the aforementioned aspect.

According to an aspect of the present disclosure, for a hybrid vehicle including: an engine and a motor, each of which is mounted as a driving source; a generator driven by the engine; a high-voltage battery and a low-voltage battery, each of which is able to be charged and discharged; a converter connected between the high-voltage battery and the low-voltage battery; and a plurality of auxiliary loads, each of which consumes electric power supplied from the high-voltage battery via the converter or electric power supplied from the low-voltage battery, a control device includes: a calculation unit that calculates predicted duration as well as a predicted lower limit reaching time during execution of a power transmission interruption function by which power transmission between the driving source and a drive wheel is interrupted, the predicted duration being a predicted value of time it takes for the execution of the power transmission interruption function to end, and the predicted lower limit reaching time being a predicted value of time it takes for a state of charge of the high-voltage battery to reach an allowable lower limit; and a control unit that executes auxiliary load limit control that stops at least one of the plurality of auxiliary loads or reduces electric power consumption of at least one of the plurality of auxiliary loads when the predicted duration is longer than the predicted lower limit reaching time.

According to the configuration, it is determined that the SOC of the high-voltage battery is highly likely to reach the allowable lower limit when the predicted duration is longer than the predicted lower limit reaching time during the execution of the power transmission interruption function (such as during the coasting drive), whereby the auxiliary load limit control is executed to stop the auxiliary load or reduce the electric power consumption of the auxiliary load. As a result, the electric power supplied from the high-voltage battery via the converter is stopped or reduced to be able to inhibit the decrease in the state of charge of the high-voltage battery and obtain the effect substantially similar to that of the aforementioned aspect.

BRIEF DESCRIPTION OF DRAWINGS

The above and other objects, features and advantages of the present disclosure will become more apparent from the following detailed description made with reference to the accompanying drawings.

DESCRIPTION OF EMBODIMENTS

First Embodiment

Figure 1:
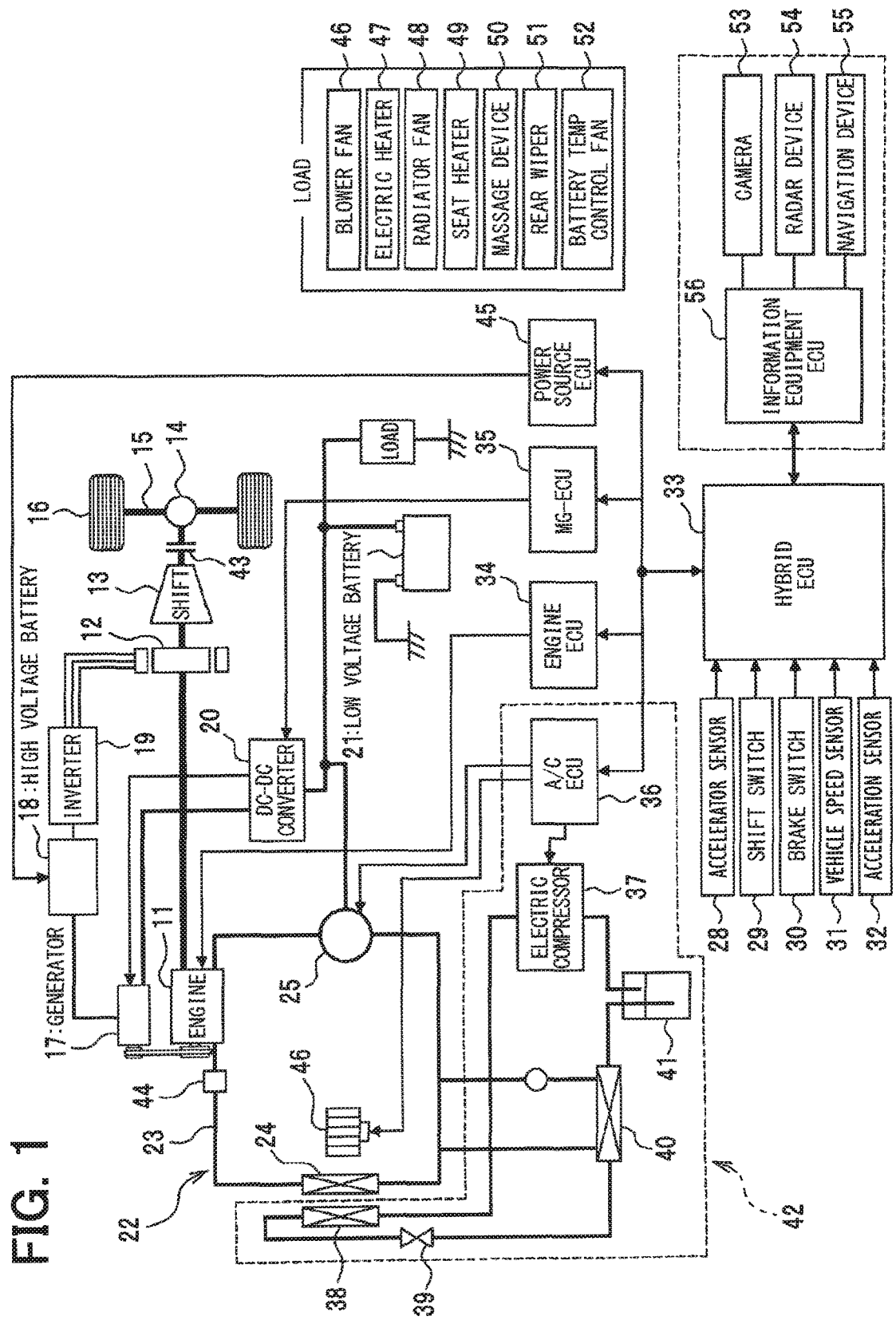
FIG. 1 is a diagram illustrating a general structure of a control system of a hybrid vehicle according to a first embodiment.

A first embodiment is described with reference to FIG. 1 to FIG. 3.

A control system for a hybrid vehicle is described with reference to FIG. 1,

A vehicle is equipped with an engine 11 being an internal-combustion engine and a motor generator (hereinafter noted as an "MG") 12 as power sources (driving sources) of the vehicle. Power of an output shaft (a crankshaft) of the engine 11 is transmitted to a transmission 13 via the MG 12, and power of an output shaft of the transmission 13 is transmitted to a wheel 16 (drive wheel) via a differential gear mechanism 14, an axle 15 and the like. The transmission 13 may be a stepped transmission by which a gear position is shifted stepwise from among a plurality of gear positions or a continuously variable transmission (CVT) by which the gear is shifted steplessly.

A rotary shaft of the MG 12 is joined to be able to transmit power between the engine 11 and the transmission 13 on a power transmission path through which the power of the engine 11 is transmitted to the wheel 16. A clutch 43 for intermittently transmitting power is provided between the transmission 13 and the differential gear mechanism 14. A clutch (not shown) for intermittently transmitting power may also be provided between the engine 11 and the MG 12 (or between the MG 12 and the transmission 13). Power transmission may also be interrupted electrically when the transmission is an electric CVT employing a power split mechanism.

Electric power generated in a generator 17 that is driven by the power of the engine 11 is charged in a high-voltage battery 8. An inverter 19 driving the MG 12 is connected to the high-voltage battery 8 so that the MG 12 gives and receives electric power to/from the high-voltage battery 18 via the inverter 19. A low-voltage battery 21 is connected to the generator 17 via a DC-DC converter 20. The high-voltage battery 18 and the low-voltage battery 21 are both chargeable/dischargeable batteries (capable of charging and discharging) where the DC-DC converter 20 is connected between the high-voltage battery 18 and the low-voltage battery 21.

An auxiliary load is connected to the DC-DC converter 20 to consume electric power supplied from the high-voltage battery 18 through the DC-DC converter 20 or electric power supplied from the low-voltage battery 21. The auxiliary load includes a blower fan 46, an electric heater 47, a radiator fan 48, a seat heater 49, a massage device 50, a rear wiper 51, and a battery temperature control fan 52, for example.

As a heater for heating the interior of the vehicle, the vehicle is equipped with a hydronic heater 22 that uses heat of a coolant of the engine 11 and an electric heater 42 (a heat pump device) that electrically generates heat.

The hydronic heater 22 is configured such that a heating hot-water circuit 23 connected to a coolant passage (not shown) of the engine 11 includes a heating heater core 24, an electric water pump 25 and a water temperature sensor 44. The electric water pump 25 is driven by electric power supplied from the low-voltage battery 21 to circulate the coolant (hot water) through the engine 11 and the heater core 24.

The electric heater 42 includes an electric compressor 37 that compresses a low-temperature, low-pressure refrigerant gas into a high-temperature, high-pressure refrigerant gas, an interior heat exchanger 38 (a condenser) that causes the high-temperature, high-pressure refrigerant gas to give off heat and turns it into a high-pressure liquid refrigerant, an expansion valve 39 that decompresses and expands the high-pressure liquid refrigerant to turn it into a low-temperature, low-pressure liquid refrigerant, an exterior heat exchanger 40 (an evaporator) that causes the low-temperature, low-pressure liquid refrigerant to absorb heat and turns it into a low-temperature, low-pressure refrigerant gas, and an accumulator 41 that separates the liquid refrigerant not evaporated in the exterior heat exchanger 40 and supplies only the refrigerant gas to the compressor 37.

The electric compressor 37 is connected to the low-voltage battery 21 via a compressor inverter (not shown). The electric compressor 37 is controlled by controlling the compressor inverter with an air conditioner ECU 36 to be described. The blower fan 46 generating hot air is disposed in the vicinity of the heater core 24 and the interior heat exchanger 38, while the radiator fan 48 is disposed in the vicinity of the exterior heat exchanger 40.

An accelerator sensor 28 detects an accelerator position (the amount of operation performed on an accelerator pedal), while a shift switch 29 detects the position to which a shift lever is operated. A brake switch 30 detects a braking operation (or a brake sensor detects the amount of the braking operation), a vehicle speed sensor 31 detects vehicle speed, and an acceleration sensor 32 detects acceleration.

A hybrid ECU 33 is a computer comprehensively controlling the entire vehicle and reads an output signal from the various sensors and switches to detect an operating state of the vehicle. The hybrid ECU 33 transmits and receives a control signal and/or a data signal to/from an engine ECU 34 controlling the operation of the engine 11, an MG-ECU 35 controlling the MG 12 by controlling the inverter 19 as well as controlling the generator 17 and the DC-DC converter 20, and the air conditioner ECU 36 controlling the heaters 22 and 42 (the electric water pump 25, the blower fan 46, the electric compressor 37 and the like), so that the engine 11, the MG 12, the generator 17, the DC-DC converter 20, the heaters 22 and 42 and the like are controlled by the ECUs 34 to 36 according to the operating state of the vehicle. The hybrid ECU 33 also transmits and receives a control signal and/or a data signal to/from a power source ECU 45 monitoring the high-voltage battery 18 and an information equipment ECU 56 controlling information appliances (such as a camera 53, a radar device 54 and a navigation device 55) installed in the vehicle.

Figure 2:
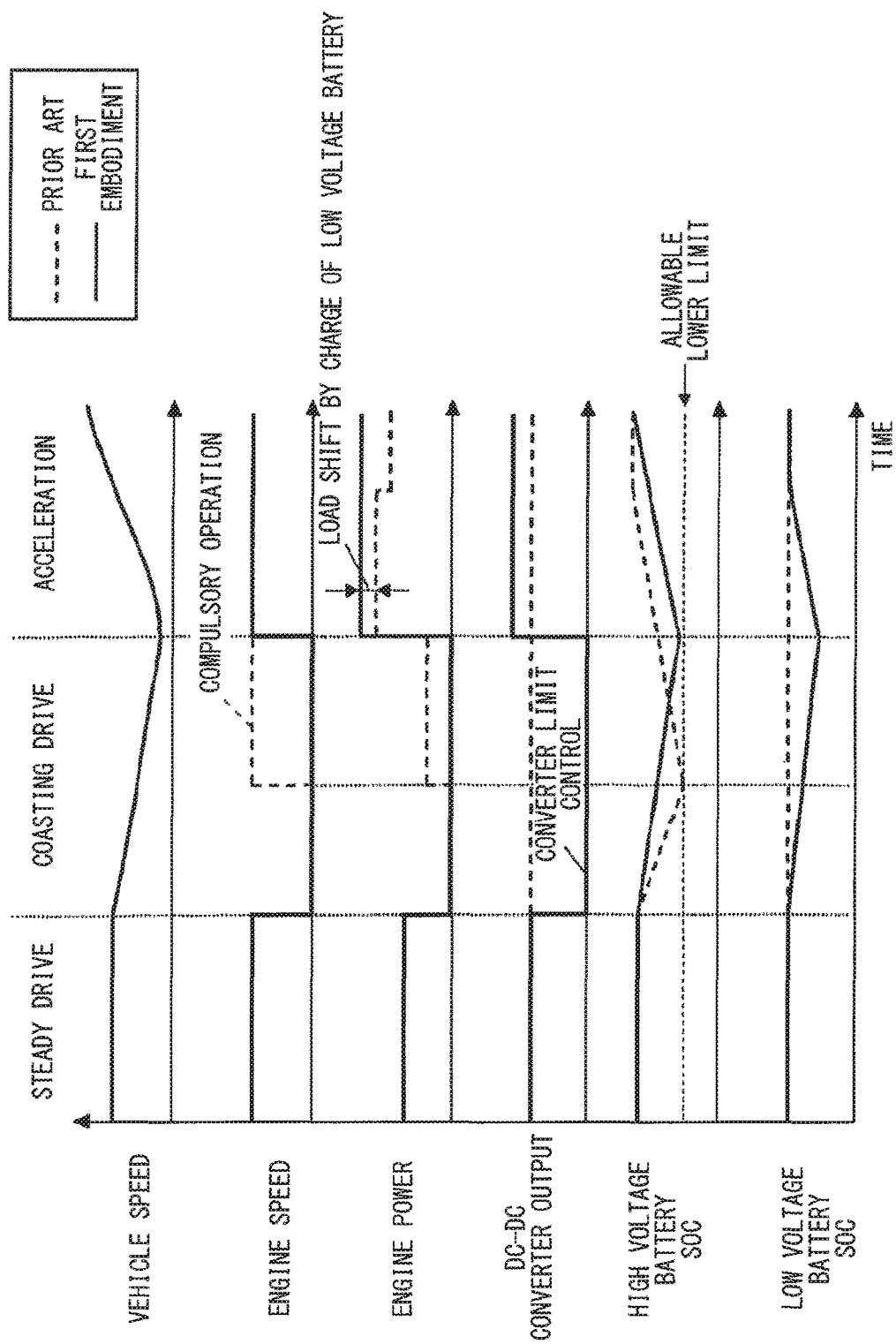
FIG. 2 is a time chart illustrating an execution example of a converter limit control according to the first embodiment.

When the vehicle decelerates (such as when the accelerator is released), as illustrated in FIG. 2, the hybrid ECU 33 executes coasting drive on which the vehicle runs in a neutral state with the clutch 43 released and power transmission interrupted between each of the engine 11 and the MG 12 and the wheel 16. Fuel consumption and a friction loss of the engine 11 can be eliminated to have increased fuel efficiency by stopping the engine 11 during the coasting drive (during the execution of a power transmission interruption function which interrupts power transmission between the driving source and the drive wheel).

While fuel efficiency can be increased by stopping the engine 11 during the coasting drive, the stopping of the engine 11 causes the generator 17 driven by the engine 11 to be stopped to thus stop electric power generation, so that a state of charge (SOC) of the high-voltage battery 18 is decreased as electric power is consumed by the auxiliary load. The SOC can be defined by an expression SOC=remaining capacity/full charge capacity×100, for example, In a conventional case as indicated by a broken line in FIG. 2, the DC-DC converter 20 is in normal operation during the coasting drive, whereby the SOC of the high-voltage battery 18 drops relatively quickly due to the auxiliary load consuming electric power and possibly reaches an allowable lower limit early. When the SOC of the high-voltage battery 8 reaches the allowable lower limit, the engine 11 needs to be forcibly brought into operation to drive the generator 17 and charge the high-voltage battery 18. However, the forcible operation of the engine 11 during the coasting drive results in inefficient running of the engine 11 and causes fuel efficiency to decrease accordingly, whereby the effect of increased fuel efficiency achieved by the coasting drive cannot be enhanced sufficiently.

Figure 3:
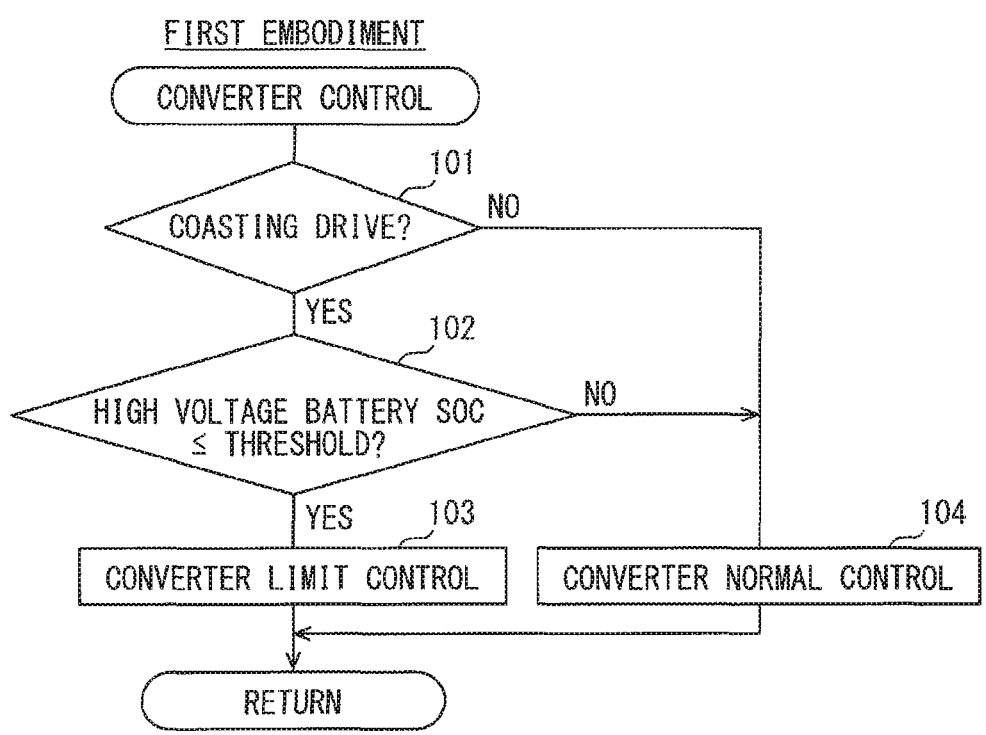
FIG. 3 is a flowchart illustrating a processing flow of a converter control routine according to the first embodiment.

Therefore, in the first embodiment, the hybrid ECU 33 performs the following control by executing a converter control routine of FIG. 3 to be described. As indicated by a solid line in FIG. 2, a converter limit control is executed to stop the DC-DC converter 20 or reduce output of the DC-DC converter 20 when the SOC of the high-voltage battery 18 equals a predetermined threshold or lower during the coasting drive (during the execution of the power transmission interruption function).

In other words, it is determined that the SOC of the high-voltage battery 18 is highly likely to reach the allowable lower limit in the middle of the coasting drive when the SOC of the high-voltage battery 18 equals the threshold or lower during the coasting drive, whereby the converter limit control is executed to stop the DC-DC converter 20 or reduce the output of the DC-DC converter 20. As a result, the electric power supplied from the high-voltage battery 18 via the DC-DC converter 20 is stopped or reduced to be able to inhibit the decrease in the SOC of the high-voltage battery 18.

Accordingly, when the engine is stopped during the coasting drive, the SOC of the high-voltage battery 18 does not reach the allowable lower limit to thus be able to avoid the forcible operation of the engine 11 and avoid degradation in fuel efficiency caused by the forcible operation of the engine 11. Alternatively, when the engine is stopped during the coasting drive, the time it takes for the SOC of the high-voltage battery 18 to reach the allowable lower limit is extended to be able to shorten the duration of the forcible operation of the engine 11 (or extend the duration for which the engine 11 is stopped) and thus reduce the degradation in fuel efficiency caused by the forcible operation of the engine 11.

While the SOC of the low-voltage battery 21 drops in accordance with the execution of the converter limit control during the coasting drive, the engine 11 can run with high efficiency by increasing the output of the engine so as to increase the amount of electric power generation used to charge the low-voltage battery 21 while the engine runs at the time of acceleration or constant speed drive following the coasting drive.

There will now be descried processing involved in the converter control routine of FIG. 3 executed by the hybrid ECU 33 in the first embodiment.

The converter control routine illustrated in FIG. 3 is executed repeatedly with a predetermined cycle while the power source of the hybrid ECU 33 is turned on, and acts as a control unit.

Upon startup of the routine, it is first determined in step 101 whether the vehicle is on the coasting drive and, when it is determined that the vehicle is not on the coasting drive, processing proceeds to step 104 to execute normal converter control and operate the DC-DC converter 20 normally. In this case, an output voltage command value of the DC-DC converter 20 is set to a normal value (such as a value calculated in accordance with a state of the vehicle).

On the other hand, when it is determined in step 101 that the vehicle is on the coasting drive, processing proceeds to step 102 to determine whether the SOC of the high-voltage battery 18 equals the threshold or lower. The threshold is set to a value higher than the allowable lower limit of the SOC of the high-voltage battery 18.

When it is determined in step 102 that the SOC of the high-voltage battery 18 is higher than the threshold, processing proceeds to step 104 to execute the normal converter control and operate the DC-DC converter 20 normally.

On the other hand, when it is determined in step 102 that the SOC of the high-voltage battery 18 equals the threshold or lower, processing proceeds to step 103 and executes the converter limit control on the basis of the determination that the SOC of the high-voltage battery 8 is highly likely to reach the allowable lower limit in the middle of the coasting drive. The converter limit control stops the DC-DC converter 20 or reduces the output of the DC-DC converter 20.

When the output of the DC-DC converter 20 is to be reduced in the converter limit control, the output voltage command value of the DC-DC converter 20 is set to a value lower than the normal value, for example. The output voltage command value of the DC-DC converter 20 may be set lower as the SOC of the high-voltage battery 18 is lower, or may be set to a fixed value. When the DC-DC converter 20 is to be stopped in the converter limit control, on the other hand, the output voltage command value of the DC-DC converter 20 is set to a minimum value (0), for example.

It may also be adapted to determine whether the SOC of the high-voltage battery 18 is lower than or equal to a second threshold, which is lower than the aforementioned threshold, and reduce the output of the DC-DC converter 20 when the SOC of the high-voltage battery 18 is higher than the second threshold, or stop the DC-DC converter 20 when the SOC of the high-voltage battery 18 equals the second threshold or lower.

According to the first embodiment described above, the converter limit control is executed to stop the DC-DC converter 20 or reduce the output of the DC-DC converter 20 when the SOC of the high-voltage battery 18 equals the threshold or lower during the coasting drive. As a result, the electric power supplied from the high-voltage battery 18 via the DC-DC converter 20 is stopped or reduced to be able to inhibit the decrease in the SOC of the high-voltage battery 18.

Accordingly, when the engine is stopped during the coasting drive, the SOC of the high-voltage battery 18 does not reach the allowable lower limit to thus be able to avoid the forcible operation of the engine 11 and avoid degradation in fuel efficiency caused by the forcible operation of the engine 11. Alternatively, when the engine is stopped during the coasting drive, the time it takes for the SOC of the high-voltage battery 18 to reach the allowable lower limit is extended to be able to shorten the duration of the forcible operation of the engine 11 (or extend the duration for which the engine 11 is stopped) and thus reduce the degradation in fuel efficiency caused by the forcible operation of the engine 11. As a result, the effect of increased fuel efficiency achieved by the coasting drive can be enhanced.

Second Embodiment

A second embodiment will now be described with reference to FIGS. 4 and 5. Note, however, that a part substantially identical to that of the first embodiment will not be described or described in a simplified manner, and thus a part different from that of the first embodiment will mainly be described.

Figure 4:
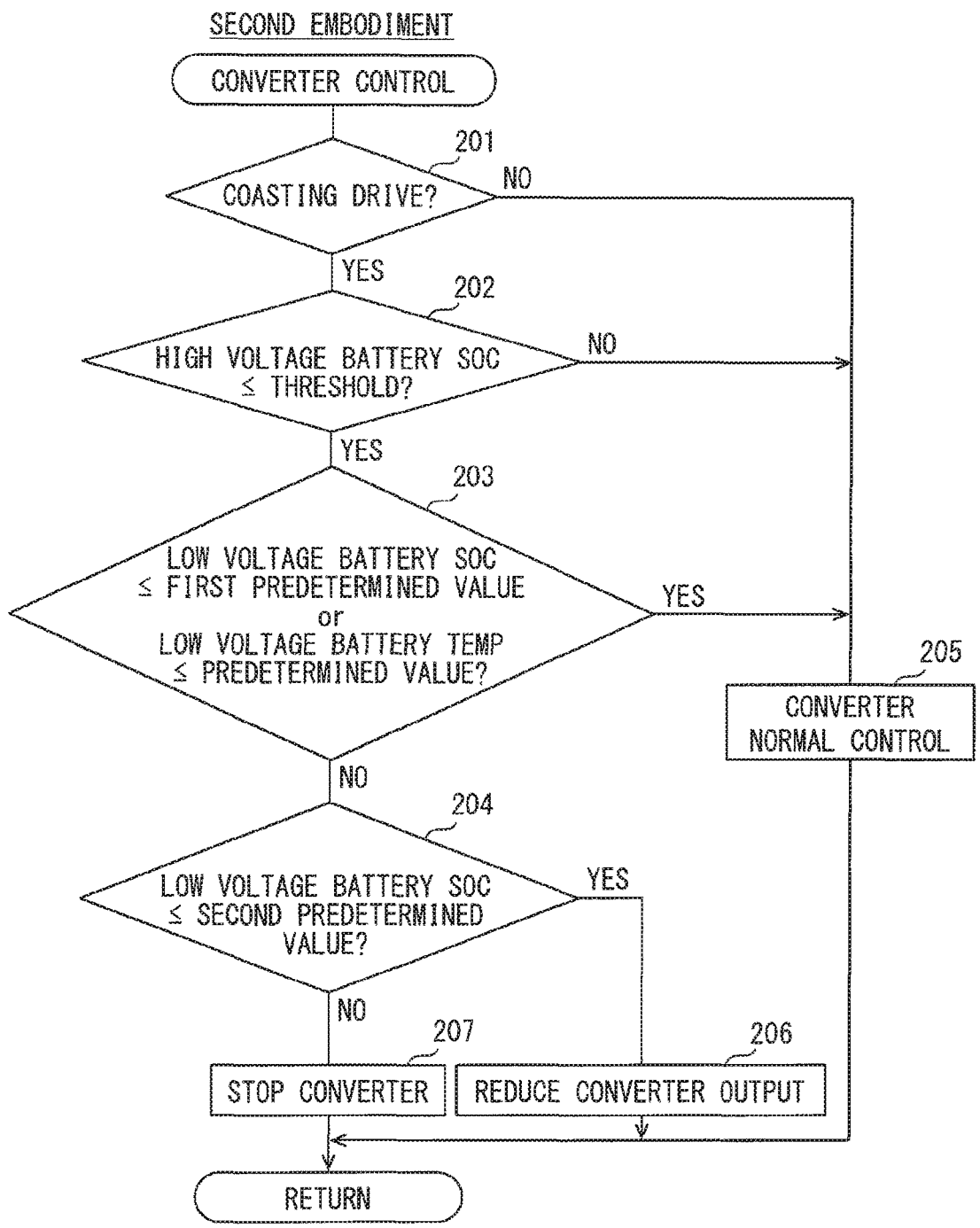
FIG. 4 is a flowchart illustrating a processing flow of a converter control routine according to a second embodiment.

In the second embodiment, a hybrid ECU 33 executes a converter control routine of FIG. 4 (to be described) to vary converter limit control according to a state of a low-voltage battery 21. Specifically, as illustrated in FIG. 5, the converter limit control is forbidden or permitted according to the state (such as an SOC or temperature) of the low-voltage battery 21, as well as a DC-DC converter 20 is controlled to have reduced output or is stopped according to the state of the low-voltage battery.

There will now be described processing involved in the converter control routine of FIG. 4 executed by the hybrid ECU 33 in the second embodiment.

In the converter control routine of FIG. 4, it is first determined in step 201 whether a vehicle is on coasting drive and, when it is determined that the vehicle is not on the coasting drive, processing proceeds to step 205 to execute normal converter control and operate the DC-DC converter 20 normally.

When it is determined in step 201 that the vehicle is on the coasting drive, processing proceeds to step 202 to determine whether an SOC of a high-voltage battery 18 equals a threshold or lower and, when the SOC of the high-voltage battery 18 is determined to be higher than the threshold, processing proceeds to step 205 to execute the normal converter control and operate the DC-DC converter 20 normally.

When it is determined in step 202 that the SOC of the high-voltage battery 18 equals the threshold or lower, on the other hand, processing proceeds to step 203 to determine whether the SOC of the low-voltage battery 21 is lower than or equal to a first predetermined value or whether temperature of the low-voltage battery 21 is lower than or equal to a predetermined value.

When it is determined in step 203 that the SOC of the low-voltage battery 21 is lower than or equal to the first predetermined value or that the temperature of the low-voltage battery 21 is lower than or equal to the predetermined value, the converter limit control is forbidden (not executed) on the basis of the determination that the SOC of the low-voltage battery 21 is highly likely to reach an allowable lower limit when the converter limit control is executed. In this case, processing proceeds to step 205 to execute the normal converter control and operate the DC-DC converter 20 normally (refer to FIG. 5).

On the other hand, when it is determined in step 203 that the SOC of the low-voltage battery 21 is higher than the first predetermined value and that the temperature of the low-voltage battery 21 is higher than the predetermined value, the converter limit control is permitted (executed) on the basis of the determination that the SOC of the low-voltage battery 21 is less likely to reach the allowable lower limit even when the converter limit control is executed. In this case, it is first determined in step 204 whether the SOC of the low-voltage battery 21 is lower than or equal to a second predetermined value which is higher than the first predetermined value.

Figure 5:
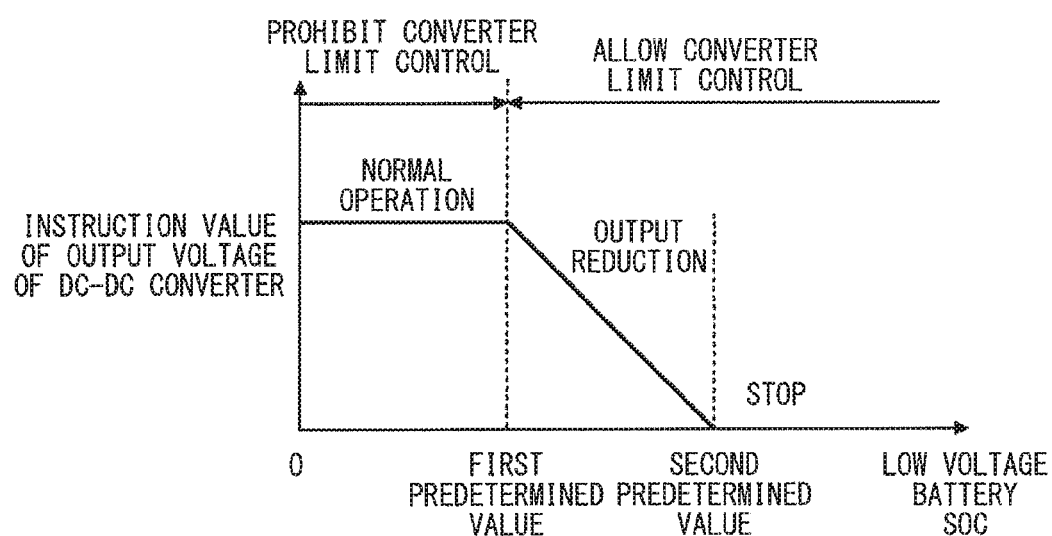
FIG. 5 is a diagram illustrating a relationship between an SOC of a low-voltage battery and an output voltage command value of a DC-DC converter.

When it is determined in step 204 that the SOC of the low-voltage battery 21 is lower than or equal to the second predetermined value, processing proceeds to step 206 and reduces output of the DC-DC converter 20 (refer to FIG. 5). In this case, for example, an output voltage command value of the DC-DC converter 20 is set to a value lower than a normal value. The output voltage command value of the DC-DC converter 20 may be set lower as the SOC of the low-voltage battery 21 is lower, or may be set to a fixed value.

On the other hand, when it is determined in step 204 that the SOC of the low-voltage battery 21 is higher than the second predetermined value, processing proceeds to step 207 to stop the DC-DC converter 20 (refer to FIG. 5). In this case, for example, the output voltage command value of the DC-DC converter 20 is set to a minimum value (0).

According to the second embodiment described above, the converter limit control is forbidden or permitted according to the state (such as the SOC or temperature) of the low-voltage battery 21, as well as the DC-DC converter 20 is controlled to have the reduced output or is stopped according to the state of the low-voltage battery. As a result, a decrease in the SOC of the high-voltage battery 18 can be inhibited while maintain ng the SOC of the low-voltage battery 21 within a proper range (preventing an excessive decrease in the SOC).

Note that while the SOC and temperature of the low-voltage battery 21 are each used as the state of the low-voltage battery 21 in the second embodiment, a voltage of the low-voltage battery 21 may also be used as the state thereof, for example.

In the second embodiment, when the SOC of the low-voltage battery 21 is higher than the first predetermined value, the DC-DC converter 20 is controlled to have the reduced output or is stopped depending on whether the SOC of the low-voltage battery 21 is lower than or equal to the second predetermined value. Alternatively, however, the second predetermined value may be omitted to reduce the output of the DC-DC converter 20 when the SOC of the low-voltage battery 21 is higher than the first predetermined value. Yet alternatively, the DC-DC converter 20 may be stopped when the SOC of the low-voltage battery 21 is higher than the first predetermined value.

Third Embodiment

A third embodiment will now be described with reference to FIGS. 6 to 8. Note, however, that a part substantially identical to that of the first embodiment and the like will not be described or described in a simplified manner, and thus a part different from that of the first embodiment and the like will mainly be described.

Figure 6:
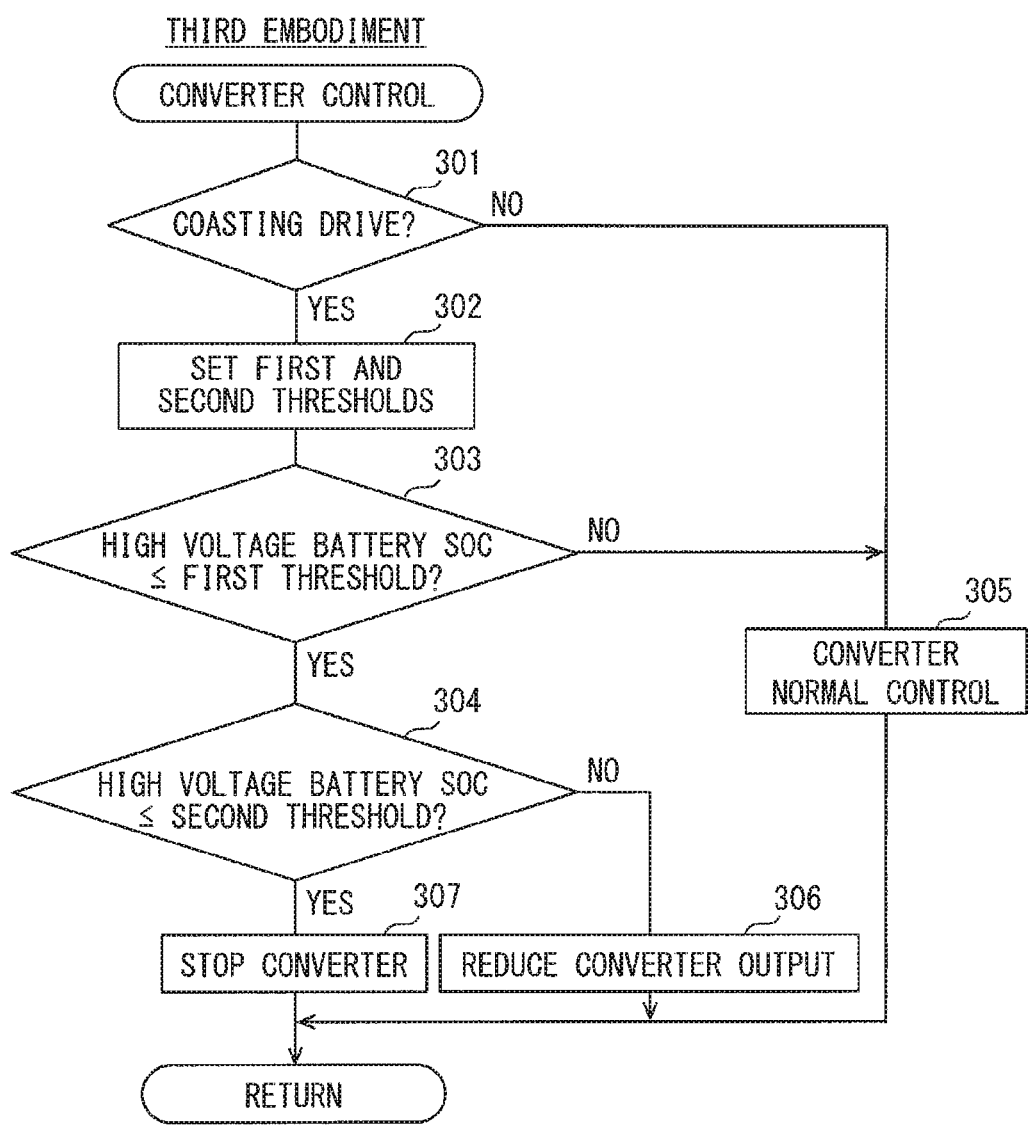
FIG. 6 is a flowchart illustrating a processing flow of a converter control routine according to a third embodiment.

In the third embodiment, a hybrid ECU 33 executes a converter control routine of FIG. 6 (to be described) to vary converter limit control according to an SOC of a high-voltage battery 18 and vehicle speed. Specifically, the converter limit control is forbidden or permitted according to the SOC of the high-voltage battery 18 and the vehicle speed, as well as a DC-DC converter 20 is controlled to have reduced output or is stopped according to the SOC of the high-voltage battery and the vehicle speed.

There will now be described processing involved in the converter control routine of FIG. 6 executed by the hybrid ECU 33 in the third embodiment.

In the converter control routine of FIG. 6, it is first determined in step 301 whether a vehicle is on coasting drive and, when it is determined that the vehicle is not on the coasting drive, processing proceeds to step 305 to execute normal converter control and operate the DC-DC converter 20 normally.

Figure 7:
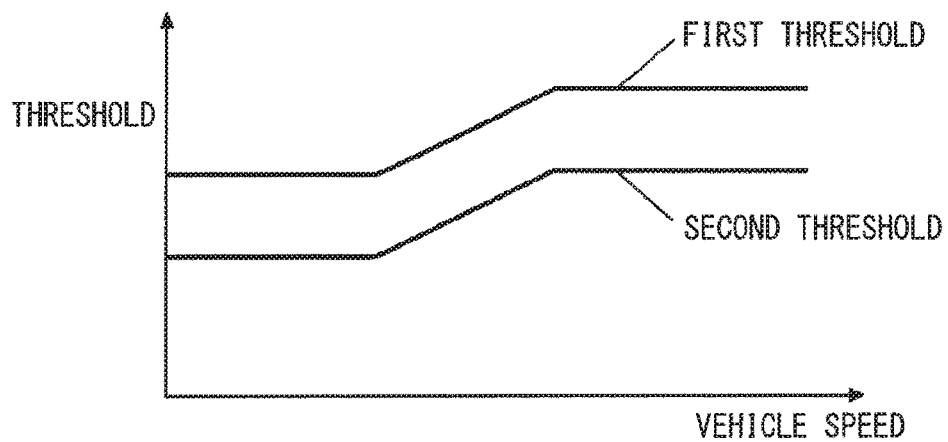
FIG. 7 is a diagram conceptually illustrating an example of a map of a threshold.

On the other hand, when it is determined in step 301 that the vehicle is on the coasting drive, processing proceeds to step 302 and refers to a map of a threshold illustrated in FIG. 7 to set a first threshold and a second threshold (first threshold>second threshold) according to the vehicle speed. The first threshold and the second threshold are each set to a value higher than an allowable lower limit of the SOC of the high-voltage battery 18. On the map of the threshold illustrated in FIG. 7, the first threshold and the second threshold are set higher in a range corresponding to higher vehicle speed than in a range corresponding to lower vehicle speed.

Processing then proceeds to step 303 to determine whether the SOC of the high-voltage battery 18 equals the first threshold or lower and forbid (do not execute) the converter limit control when the SOC of the high-voltage battery 18 is determined to be higher than the first threshold. In this case, processing proceeds to step 305 to execute the normal converter control and operate the DC-DC converter 20 normally (refer to FIG. 8).

On the other hand, when it is determined in step 303 that the SOC of the high-voltage battery 18 equals the first threshold or lower, the converter limit control is permitted (executed) on the basis of the determination that the SOC of the high-voltage battery 18 is highly likely to reach the allowable lower limit in the middle of the coasting drive. In this case, processing proceeds to step 304 and determines whether the SOC of the high-voltage battery 18 equals the second threshold or lower.

Figure 8:
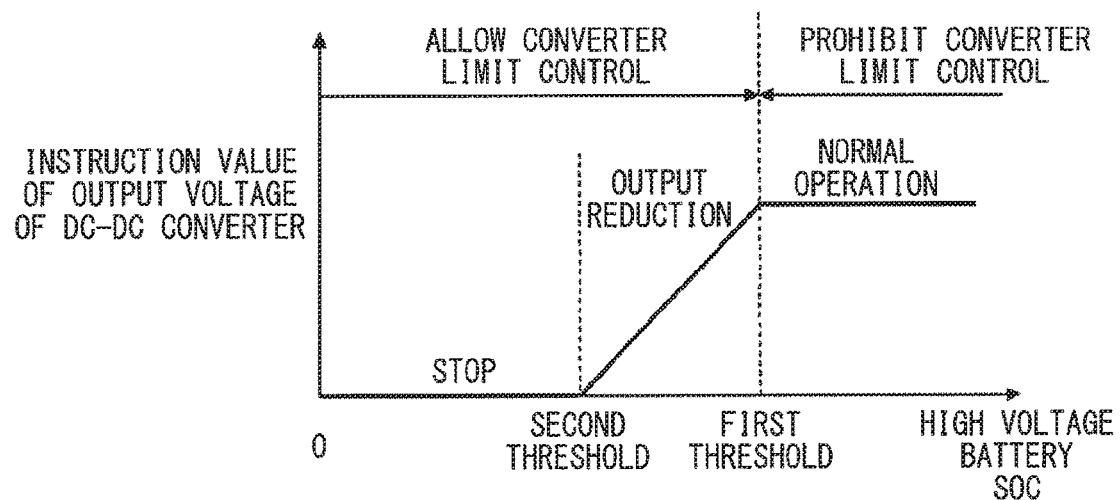
FIG. 8 is a diagram illustrating a relationship between an SOC of a high-voltage battery and the output voltage command value of the DC-DC converter.

When it is determined in step 304 that the SOC of the high-voltage battery 18 is higher than the second threshold, processing proceeds to step 306 and reduces output of the DC-DC converter 20 (refer to FIG. 8). In this case, for example, an output voltage command value of the DC-DC converter 20 is set to a value lower than a normal value. The output voltage command value of the DC-DC converter 20 may be set lower as the SOC of the high-voltage battery 18 is lower, or may be set to a fixed value.

On the other hand, when it is determined in step 304 that the SOC of the high-voltage battery 18 is lower than or equal to the second threshold, processing proceeds to step 307 and stops the DC-DC converter 20 (refer to FIG. 8). In this case, for example, the output voltage command value of the DC-DC converter 20 is set to a minimum value (0).

According to the third embodiment described above, the converter limit control is forbidden or permitted according to the SOC of the high-voltage battery 18 and the vehicle speed, as well as the DC-DC converter 20 is controlled to have the reduced output or is stopped according to the SOC of the high-voltage battery and the vehicle speed. The converter limit control thus does not have to be executed more than necessary. Moreover, the duration of the coasting drive is highly likely to be extended when the vehicle travels at high speed, in which case the converter limit control is executed early to be able to prepare for the extended coasting drive.

In the third embodiment, when the SOC of the high-voltage battery 18 is lower than or equal to the first threshold, the DC-DC converter 20 is controlled to have the reduced output or is stopped depending on whether the SOC of the high-voltage battery 18 is lower than or equal to the second threshold. Alternatively, however, the second threshold may be omitted to reduce the output of the DC-DC converter 20 when the SOC of the high-voltage battery 8 is lower than or equal the first threshold. Yet alternatively, the DC-DC converter 20 may be stopped when the SOC of the high-voltage battery 8 is lower than or equal to the first threshold.

Fourth Embodiment

A fourth embodiment will now be described with reference to FIG. 9. Note, however, that a part substantially identical to that of the first embodiment and the like will not be described or described in a simplified manner, and thus a part different from that of the first embodiment and the like will mainly be described.

Figure 9:
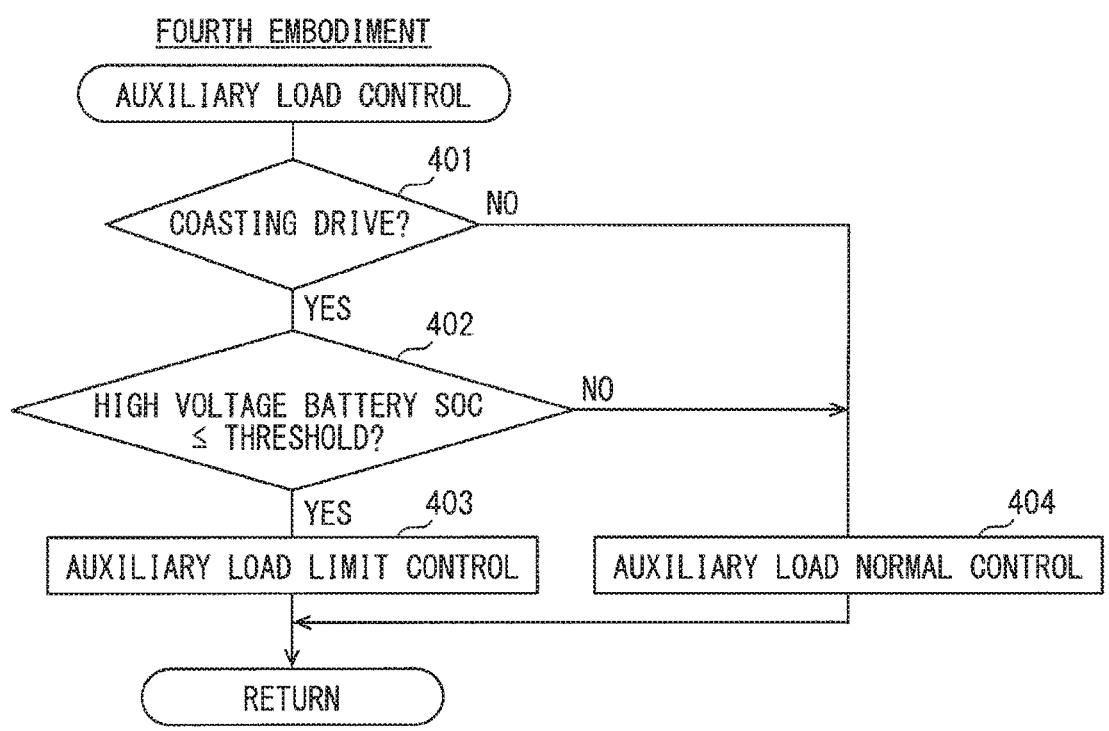
FIG. 9 is a flowchart illustrating a processing flow of an auxiliary load control routine according to a fourth embodiment.

In the fourth embodiment, a hybrid ECU 33 executes an auxiliary load control routine of FIG. 9 (to be described) to execute auxiliary load limit control that stops or reduces electric power consumption of at least one auxiliary load when an SOC of a high-voltage battery 18 equals a predetermined threshold or lower during coasting drive.

In other words, it is determined that the SOC of the high-voltage battery 18 is highly likely to reach an allowable lower limit in the middle of the coasting drive when the SOC of the high-voltage battery 18 equals the threshold or lower during the coasting drive, whereby the auxiliary load limit control is executed to stop at least one auxiliary load or reduce the electric power consumption of at least one auxiliary load. As a result, the electric power supplied from the high-voltage battery 18 via a DC-DC converter 20 is stopped or reduced to be able to inhibit a decrease in the SOC of the high-voltage battery 18.

Note that one, two or more auxiliary loads to be subjected to the auxiliary load limit control (such load will be hereinafter simply referred to as an "auxiliary load to be controlled") is/are selected from among a blower fan 46, an electric heater 47, a radiator fan 48, a seat heater 49, a massage device 50, a rear wiper 51, a battery temperature control fan 52, and an electric compressor 37, for example. The auxiliary load to be controlled may be set in advance or changed according to a state of a vehicle.

There will now be described processing involved in the auxiliary load control routine of FIG. 9 executed by the hybrid ECU 33 in the fourth embodiment.

In the auxiliary load control routine of FIG. 9, it is first determined in step 401 whether the vehicle is on the coasting drive and, when it is determined that the vehicle is not on the coasting drive, processing proceeds to step 404 to execute normal auxiliary load control and operate the auxiliary load to be controlled normally. In this case, an upper limit of the electric power consumption of the auxiliary load to be controlled is set to a normal value (such as a value calculated in accordance with the state of the vehicle), for example.

On the other hand, when it is determined in step 401 that the vehicle is on the coasting drive, processing proceeds to step 402 to determine whether the SOC of the high-voltage battery 18 equals a threshold or lower and, when the SOC of the high-voltage battery 18 is determined to be higher than the threshold, processing proceeds to step 404 to execute the normal auxiliary load control and operate the auxiliary load to be controlled normally.

On the other hand, when it is determined in step 402 that the SOC of the high-voltage battery 18 equals the threshold or lower, processing proceeds to step 403 and executes the auxiliary load limit control on the basis of the determination that the SOC of the high-voltage battery 18 is highly likely to reach the allowable lower limit in the middle of the coasting drive. The auxiliary load limit control stops or reduces the electric power consumption of the auxiliary load to be controlled without greatly affecting driving safety and comfort.

When the auxiliary load limit control reduces the electric power consumption of the auxiliary load to be controlled, the upper limit of the electric power consumption of the auxiliary load to be controlled is set to a value lower than the normal value, for example. The upper limit of the electric power consumption of the auxiliary load to be controlled may be set lower as the SOC of the high-voltage battery 18 is lower, or may be set to a fixed value. When the auxiliary load limit control stops the auxiliary load to be controlled, on the other hand, the upper limit of the electric power consumption of the auxiliary load to be controlled is set to a minimum value (0), for example.

It may also be adapted to determine whether the SOC of the high-voltage battery 18 is lower than or equal to a second threshold, which is lower than the aforementioned threshold, and reduce the electric power consumption of the auxiliary load to be controlled when the SOC of the high-voltage battery 18 is higher than the second threshold, or stop the auxiliary load to be controlled when the SOC of the high-voltage battery 18 equals the second threshold or lower.

According to the fourth embodiment described above, the auxiliary load limit control is executed to stop the auxiliary load to be controlled or reduce the electric power consumption of the auxiliary load to be controlled when the SOC of the high-voltage battery 18 equals the threshold or lower during the coasting drive. As a result, the electric power supplied from the high-voltage battery 18 via the DC-DC converter 20 is stopped or reduced to be able to inhibit the decrease in the SOC of the high-voltage battery 18 and obtain the effect substantially similar to that of the first embodiment.

Fifth Embodiment

A fifth embodiment will now be described with reference to FIGS. 10 and 11. Note, however, that a part substantially identical to that of the fourth embodiment and the like will not be described or described in a simplified manner, and thus a part different from that of the fourth embodiment and the like will mainly be described.

Figure 10:
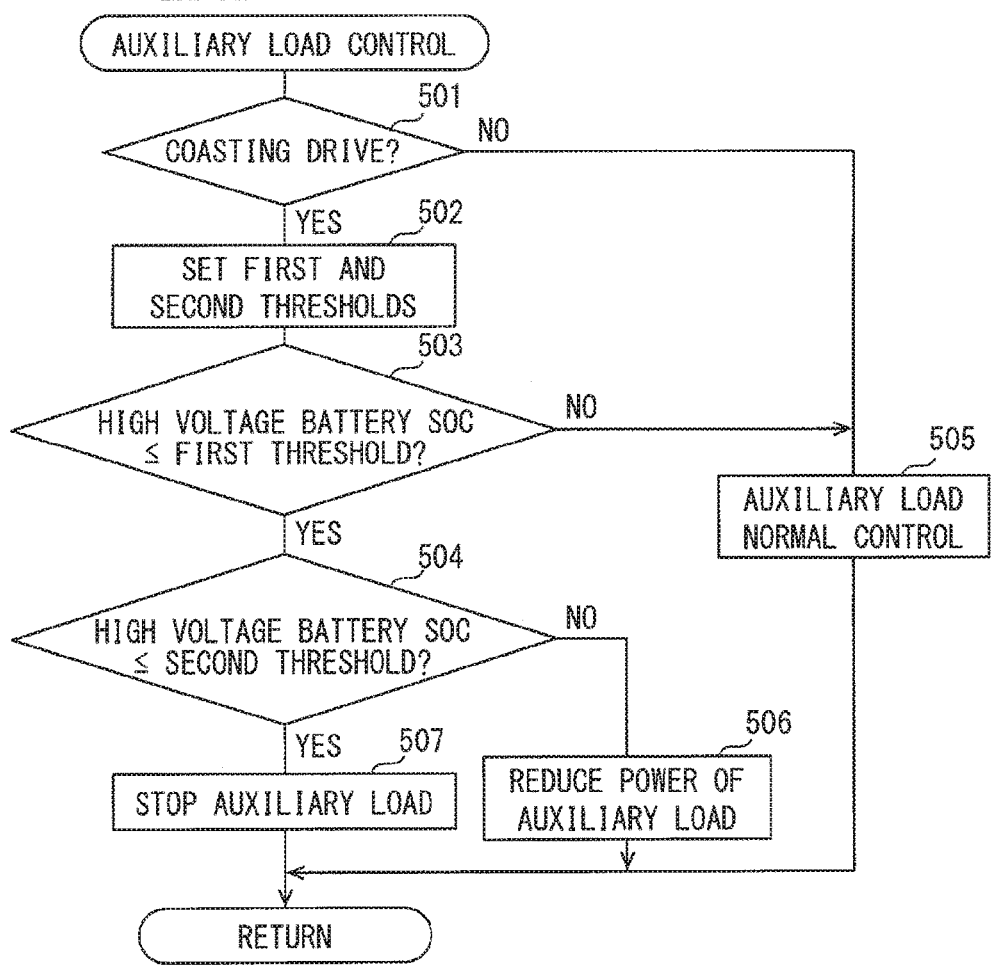
FIG. 10 is a flowchart illustrating a processing flow of an auxiliary load control routine according to a fifth embodiment.

In the fifth embodiment, a hybrid ECU 33 executes an auxiliary load control routine of FIG. 10 (to be described) to vary auxiliary load limit control according to an SOC of a high-voltage battery 18 and vehicle speed. Specifically, the auxiliary load limit control is forbidden or permitted according to the SOC of the high-voltage battery 18 and the vehicle speed, as well as an auxiliary load to be controlled consumes less electric power or is stopped according to the SOC of the high-voltage battery and the vehicle speed.

There will now be described processing involved in the auxiliary load control routine of FIG. 10 executed by the hybrid ECU 33 in the fifth embodiment.

In the auxiliary load control routine of FIG. 10, it is first determined in step 501 whether a vehicle is on the coasting drive and, when it is determined that the vehicle is not on the coasting drive, processing proceeds to step 505 to execute normal auxiliary load control and operate the auxiliary load to be controlled normally.

On the other hand, when it is determined in step 501 that the vehicle is on the coasting drive, processing proceeds to step 502 and refers to a map of a threshold illustrated in FIG. 7 to set a first threshold and a second threshold (first threshold>second threshold) according to the vehicle speed.

Processing then proceeds to step 503 to determine whether the SOC of the high-voltage battery 18 equals the first threshold or lower and forbid (do not execute) the auxiliary load limit control when the SOC of the high-voltage battery 18 is determined to be higher than the first threshold. In this case, processing proceeds to step 505 to execute the normal auxiliary load control and operate the auxiliary load to be controlled normally (refer to FIG. 11).

On the other hand, when it is determined in step 503 that the SOC of the high-voltage battery 18 equals the first threshold or lower, the auxiliary load limit control is permitted (executed) on the basis of the determination that the SOC of the high-voltage battery 18 is highly likely to reach an allowable lower limit in the middle of the coasting drive. In this case, processing proceeds to step 504 and determines whether the SOC of the high-voltage battery 18 equals the second threshold or lower.

Figure 11:
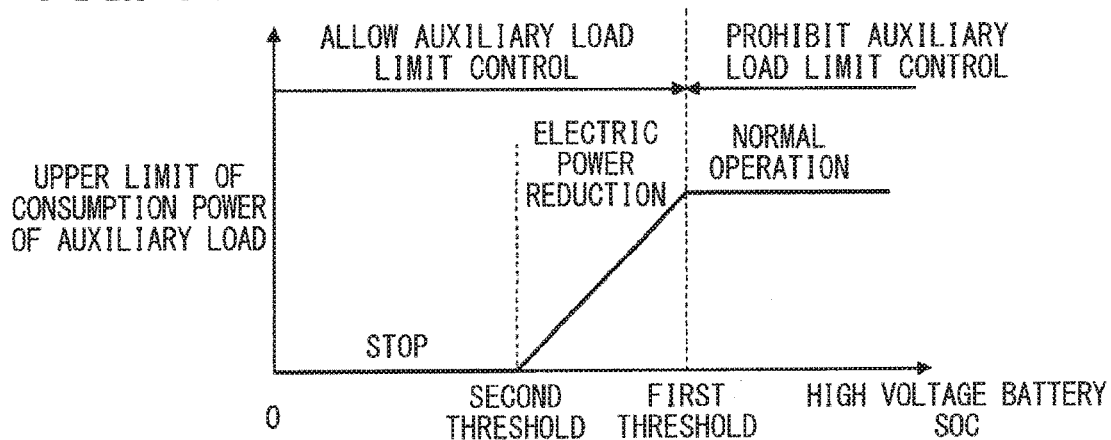
FIG. 11 is a diagram illustrating a relationship between the SOC of the high-voltage battery and an upper limit of electric power consumption of an auxiliary load.

When it is determined in step 504 that the SOC of the high-voltage battery 18 is higher than the second threshold, processing proceeds to step 506 and reduces electric power consumption of the auxiliary load to be controlled (refer to FIG. 11). In this case, an upper limit of the electric power consumption of the auxiliary load to be controlled is set to a value lower than a normal value, for example. The upper limit of the electric power consumption of the auxiliary load to be controlled may be set lower as the SOC of the high-voltage battery 8 is lower, or may be set to a fixed value.

On the other hand, when it is determined in step 504 that the SOC of the high-voltage battery 18 is lower than or equal to the second threshold, processing proceeds to step 507 and stops the auxiliary load to be controlled (refer to FIG. 11). In this case, the upper limit of the electric power consumption of the auxiliary load to be controlled is set to a minimum value (0), for example. According to the fifth embodiment described above, the auxiliary load limit control is forbidden or permitted according to the SOC of the high-voltage battery 18 and the vehicle speed, as well as the auxiliary load to be controlled consumes less electric power or is stopped according to the SOC of the high-voltage battery and the vehicle speed. The auxiliary load limit control thus does not have to be executed more than necessary. Moreover, the duration of the coasting drive is highly likely to be extended when the vehicle travels at high speed, in which case the auxiliary load limit control is executed early to be able to prepare for the extended coasting drive.

In the fifth embodiment, when the SOC of the high-voltage battery 18 is lower than or equal to the first threshold, the auxiliary load to be controlled consumes less electric power or is stopped depending on whether the SOC of the high-voltage battery 18 is lower than or equal to the second threshold. Alternatively, however, the second threshold may be omitted to reduce the electric power consumption of the auxiliary load to be controlled when the SOC of the high-voltage battery 18 is lower than or equal the first threshold. Yet alternatively, the auxiliary load to be controlled may be stopped when the SOC of the high-voltage battery 18 is lower than or equal to the first threshold.

Sixth Embodiment

A sixth embodiment will now be described with reference to FIGS. 12 and 13. Note, however, that a part substantially identical to that of the first embodiment and the like will not be described or described in a simplified manner, and thus a part different from that of the first embodiment and the like will mainly be described.

and $\theta(t)=\theta 0$ (where $\theta 0$ is a current road gradient) into the aforementioned expression (1).

[Expression 2]

$$\frac{1}{2}MV_0^2 = \int_0^{Test}\{Mg\sin\theta_0 + a + b(V_0 - \alpha t) + c(V_0 - \alpha t)^2\}dt \qquad (2)$$

$$= (Mg\sin\theta_0 + a + bV_0 + cV_0^2)\text{Test} - \frac{1}{2}(b + 2cV_0)\alpha\text{Test}^2 + \frac{1}{3}c\alpha\text{Test}^3$$

Figure 12:
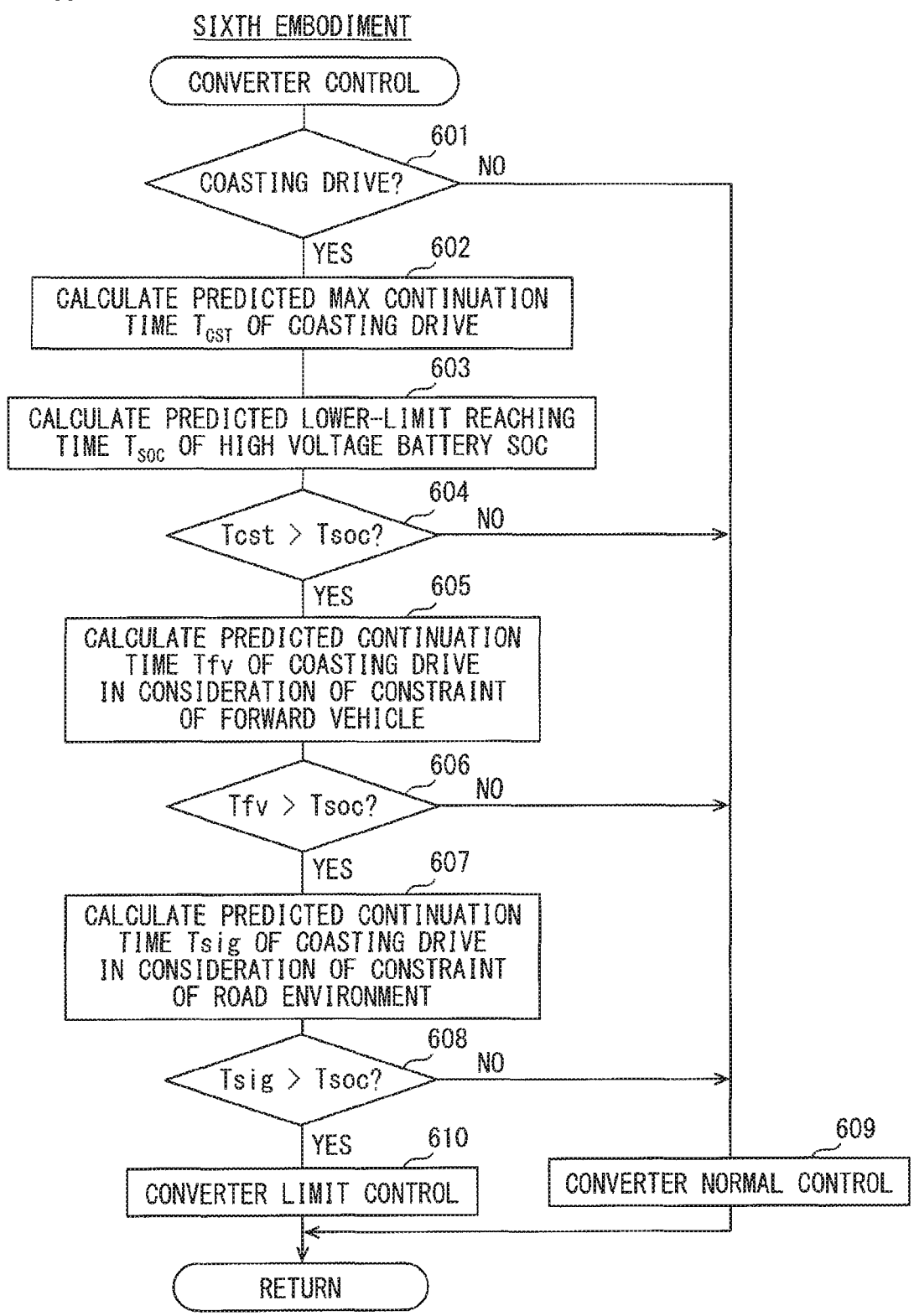
FIG. 12 is a flowchart illustrating a processing flow of a converter control routine according to a sixth embodiment.

In the sixth embodiment, a hybrid ECU 33 performs the following control by executing a converter control routine of FIG. 12 to be described. In the middle of coasting drive (during the execution of a power transmission interruption function), the hybrid ECU calculates a predicted duration that is a predicted value of time it takes for the coasting drive (the execution of the power transmission interruption function) to end as well as a predicted lower limit reaching time that is a predicted value of time it takes for an SOC of a high-voltage battery 18 to reach an allowable lower limit. Converter limit control is then executed when the predicted duration of the coasting drive is longer than the predicted lower limit reaching time of the SOC of the high-voltage battery 18. The hybrid ECU 33 of the present embodiment corresponds to a calculation unit.

In other words, it is determined that the SOC of the high-voltage battery 18 is highly likely to reach the allowable lower limit in the middle of the coasting drive when the predicted duration is longer than the predicted lower limit reaching time during the coasting drive, whereby the converter limit control is executed to stop a DC-DC converter 20 or reduce output of the DC-DC converter 20. As a result, the electric power supplied from the high-voltage battery 18 via the DC-DC converter 20 is stopped or reduced to be able to inhibit a decrease in the SOC of the high-voltage battery 18.

There will now be described processing involved in the converter control routine of FIG. 12 executed by the hybrid ECU 33 in the sixth embodiment.

In the converter control routine of FIG. 12, it is first determined in step 601 whether a vehicle is on the coasting drive and, when it is determined that the vehicle is not on the coasting drive, processing proceeds to step 609 to execute normal converter control and operate the DC-DC converter 20 normally.

On the other hand, when it is determined in step 601 that the vehicle is on the coasting drive, processing proceeds to step 602 and calculates a predicted max continuation time Tcst of the coasting drive as follows on the basis of vehicle speed V and a road gradient θ.

(a) When the road is flat or uphill (θ≥0), the predicted max continuation time Tcst is calculated by using the following expression (1) that defines a relationship between current kinetic energy of the vehicle and the predicted max continuation time Tcst of the coasting drive.

[Expression 1]

$$\tfrac{1}{2}MV_0^2 = \int_0^{Tcst}\{Mg\sin\theta(t)+a+bV(t)+cV(t)^2\}dt \qquad (1)$$

In the expression, M represents vehicle weight, and V0 represents current vehicle speed. Moreover, $a+bV(t)+cV(t)^2$ represents a running resistance at vehicle speed V (t).

Specifically, the following expression (2) is obtained by substituting V (t)=V0+αt (where α is acceleration found from past vehicle speed and usually takes a negative value)

The predicted max continuation time Tcst is found by solving the aforementioned expression (2) for the predicted max continuation time Tcst.

(b) When the road is downhill (θ<0), potential energy of the vehicle keeps being converted into the kinetic energy so that the vehicle speed does not equal zero (i.e., the vehicle accelerates). A legal speed limit Vsl is thus provided as the upper speed limit to find time it takes for the downhill to end as the predicted max continuation time Tcst.

Specifically, a distance Zsl to the end of the downhill is acquired from a navigation device 55 or the like, and the lower of the current vehicle speed V0 and the legal speed limit Vsl is obtained as Vmin=min (V0, Vsl). The predicted max continuation time Tcst is then found by an expression Tcst=Zsl/Vmin using the distance Zsl and the speed Vmin.

Note that when there is room in the capacity of a CPU, the predicted max continuation time Tcst may be calculated on the basis of actual vehicle speed and an actual road gradient without approximation.

Processing thereafter proceeds to step 603 and calculates a predicted lower limit reaching time Tsoc for the SOC of the high-voltage battery 8 as follows on the basis of a past behavior of the SOC of the high-voltage battery 18.

Figure 13:
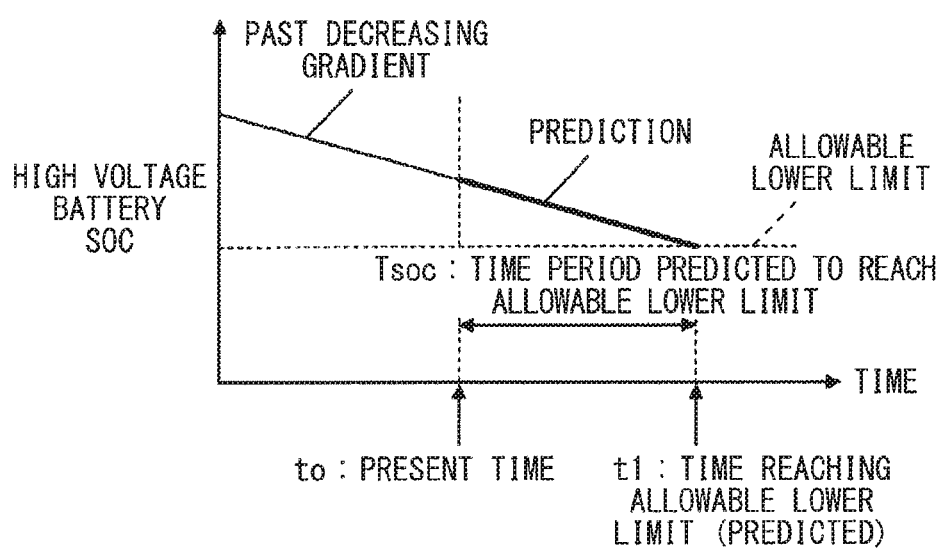
FIG. 13 is a time chart used to describe a method of calculating a predicted lower limit reaching time.

As illustrated in FIG. 13, a decreasing gradient (such as the amount of decline per unit time) of the SOC of the high-voltage battery 18 in the past (such as a predetermined period before present time t0) is found first. Then on the basis of a prediction that the SOC of the high-voltage battery 18 declines from here on (after the present time t0) with a decreasing gradient equivalent to the past decreasing gradient, the past decreasing gradient and the SOC of the high-voltage battery 18 at the present time t0 are used to calculate (predict) time from the present time t0 to a time point t1 at which the SOC of the high-voltage battery 18 reaches the allowable lower limit, whereby the calculated time is treated as the predicted lower limit reaching time Tsoc.

Processing thereafter proceeds to step 604 and determines whether the predicted max continuation time Tcst of the coasting drive is longer than the predicted lower limit reaching time Tsoc of the SOC of the high-voltage battery 18. When it is determined in step 604 that the predicted max continuation time Tcst is shorter than or equal to the predicted lower limit reaching time Tsoc, processing proceeds to step 609 to execute the normal converter control and operate the DC-DC converter 20 normally.

On the other hand, when it is determined in step 604 that the predicted max continuation time Tcst is longer than the predicted lower limit reaching time Tsoc, processing proceeds to step 605 and calculates a predicted continuation time Tfv of the coasting drive as follows while taking into consideration constraints of a forward vehicle ahead the subject vehicle (such as the distance from the forward vehicle and the speed relative to the forward vehicle ahead).

The distance from the vehicle ahead and the speed relative to the vehicle ahead are acquired from a radar device 54 or the like and used to calculate (predict) time it takes for the subject vehicle to overtake the forward vehicle ahead, whereby the calculated time is treated as the predicted continuation time Tfv.

Processing thereafter proceeds to step 606 and determines whether the predicted continuation time Tfv of the coasting drive considering the constraints of the vehicle ahead is longer than the predicted lower limit reaching time Tsoc of the SOC of the high-voltage battery 18. When it is determined in step 606 that the predicted continuation time Tfv is shorter than or equal to the predicted lower limit reaching time Tsoc, processing proceeds to step 609 to execute the normal converter control and operate the DC-DC converter 20 normally.

On the other hand, when it is determined in step 606 that the predicted continuation time Tfv is longer than the predicted lower limit reaching time Tsoc, processing proceeds to step 607 and calculates a predicted continuation time Tsig of the coasting drive as follows while taking into consideration constraints of a road environment (such as the distance to each of a temporary stop and a railroad crossing, the distance to a traffic signal and the status of the traffic signal).

The distance to the temporary stop is acquired from the navigation device 55 or the like and used along with the current vehicle speed to calculate (predict) time it takes for the vehicle to arrive at the temporary stop, whereby the calculated time is treated as the predicted continuation time Tsig.

Note that the distance to the railroad crossing may be acquired from the navigation device 55 or the like and used along with the current vehicle speed to calculate (predict) time it takes for the vehicle to arrive at the railroad crossing, whereby the calculated time may be treated as the predicted continuation time Tsig.

Alternatively, the distance to the traffic signal may be acquired from the navigation device 55 or the like while at the same time the status (red, green, or yellow) of the traffic signal may be acquired from a camera 53, the navigation device 55 or the like, whereby the distance to the traffic signal and the status thereof are used to predict whether the vehicle arrives at the traffic signal on a red light. When the vehicle is predicted to arrive at the traffic signal on the red light, the distance to the traffic signal and the current vehicle speed are used to calculate (predict) time it takes for the vehicle to arrive at the traffic signal, whereby the calculated time may be treated as the predicted continuation time Tsig.

The shortest duration among the predicted continuation time Tsig found from the distance to the temporary stop or the like, the predicted continuation time Tsig found from the distance to the railroad crossing or the like, and the predicted continuation time Tsig found from the distance to the traffic signal or the like may be treated as a final predicted continuation time Tsig.

Processing thereafter proceeds to step 608 and determines whether the predicted continuation time Tsig of the coasting drive considering the constraints of the road environment is longer than the predicted lower limit reaching time Tsoc of the SOC of the high-voltage battery 18. When it is determined in step 608 that the predicted continuation time Tsig is shorter than or equal to the predicted lower limit reaching time Tsoc, processing proceeds to step 609 to execute the normal converter control and operate the DC-DC converter 20 normally.

On the other hand, when it is determined in step 608 that the predicted continuation time Tsig is longer than the predicted lower limit reaching time Tsoc, processing proceeds to step 610 and executes the converter limit control on the basis of the determination that the SOC of the high-voltage battery 18 is highly likely to reach the allowable lower limit in the middle of the coasting drive. The converter limit control stops the DC-DC converter 20 or reduces the output of the DC-DC converter 20.

The routine of FIG. 12 is adapted to compare each of the predicted max continuation time Tcst, the predicted continuation time Tfv considering the constraints of the vehicle ahead, and the predicted continuation time Tsig considering the constraints of the road environment with the predicted lower limit reaching time Tsoc. Alternatively, however, the shortest duration among the predicted max continuation time Tcst, the predicted continuation time Tfv considering the constraints of the vehicle ahead, and the predicted continuation time Tsig considering the constraints of the road environment may be used as the final predicted duration, in which case the converter limit control may be executed when the final predicted duration is longer than the predicted lower limit reaching time Tsoc.

The sixth embodiment described above is adapted to calculate the predicted duration of the coasting drive as well as the predicted lower limit reaching time of the SOC of the high-voltage battery 18 during the coasting drive and execute the converter limit control when the predicted duration of the coasting drive is longer than the predicted lower limit reaching time of the SOC of the high-voltage battery 18. As a result, the electric power supplied from the high-voltage battery 18 via the DC-DC converter 20 is stopped or reduced to be able to inhibit the decrease in the SOC of the high-voltage battery 18 and obtain the effect substantially similar to that of the first embodiment.

The sixth embodiment is also adapted to calculate the predicted duration on the basis of the vehicle speed, the road gradient, the constraints of the forward vehicle ahead the subject vehicle, the constraints of the road environment and the like. The time it takes for the coasting drive to end varies depending on the vehicle speed, the road gradient, the constraints of the vehicle ahead, the constraints of the road environment and the like, and thus the predicted duration can be obtained accurately by calculating the predicted duration on the basis of the vehicle speed, the road gradient, the constraints of the vehicle ahead, the constraints of the road environment and the like.

The sixth embodiment is further adapted to calculate the predicted lower limit reaching time on the basis of the past behavior of the SOC of the high-voltage battery 18. A future behavior of the SOC of the high-voltage battery 18 can be predicted from the past behavior (such as the decreasing gradient) of the SOC of the high-voltage battery 18, whereby the predicted lower limit reaching time can be obtained accurately by calculating the predicted lower limit reaching time on the basis of the past behavior of the SOC of the high-voltage battery 18.

Seventh Embodiment

A seventh embodiment will now be described with reference to FIG. 14. Note, however, that a part substantially identical to that of the sixth embodiment and the like will not be described or described in a simplified manner, and thus a part different from that of the sixth embodiment and the like will mainly be described.

Figure 14:
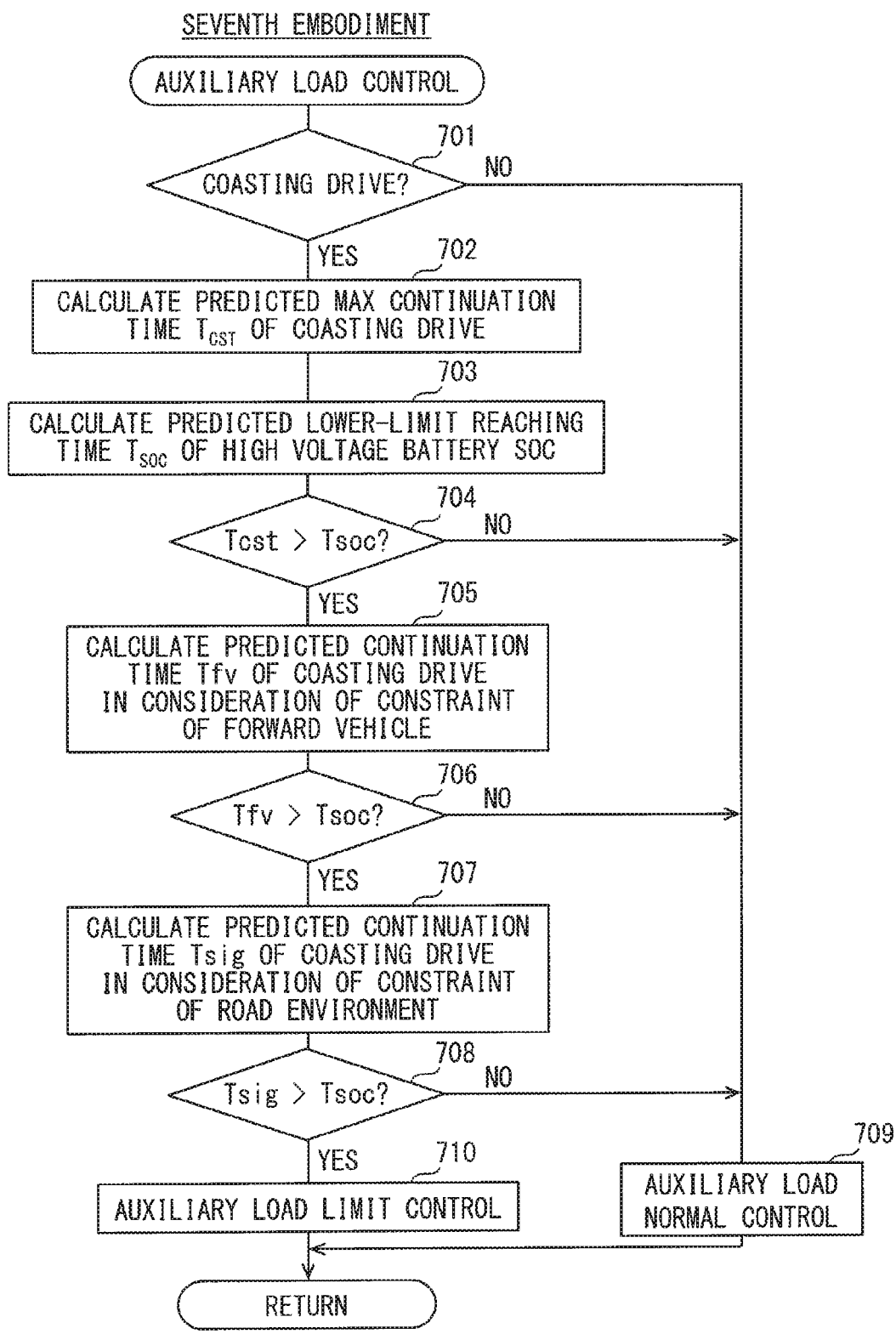
FIG. 14 is a flowchart illustrating a processing flow of an auxiliary load control routine according to a seventh embodiment.

In the seventh embodiment, a hybrid ECU 33 executes an auxiliary load control routine of FIG. 14 (to be described) to calculate predicted duration of coasting drive as well as a predicted lower limit reaching time for an SOC of a high-voltage battery 18 during the coasting drive and execute auxiliary load limit control when the predicted duration is longer than the predicted lower limit reaching time. The hybrid ECU 33 of the present embodiment corresponds to a calculation unit.

In other words, it is determined that the SOC of the high-voltage battery 18 is highly likely to reach an allowable lower limit in the middle of the coasting drive when the predicted duration is longer than the predicted lower limit reaching time during the coasting drive, whereby the auxiliary load limit control is executed to stop an auxiliary load to be controlled or reduce electric power consumption of the auxiliary load to be controlled. As a result, the electric power supplied from the high-voltage battery 18 via a DC-DC converter 20 is stopped or reduced to be able to inhibit a decrease in the SOC of the high-voltage battery 18.

There will now be described processing involved in the auxiliary load control routine of FIG. 14 executed by the hybrid ECU 33 in the seventh embodiment.

In the auxiliary load control routine of FIG. 14, it is first determined in step 701 whether a vehicle is on the coasting drive and, when it is determined that the vehicle is not on the coasting drive, processing proceeds to step 709 to execute normal auxiliary load control and operate the auxiliary load to be controlled normally.

On the other hand, when it is determined in step 701 that the vehicle is on the coasting drive, processing proceeds to step 702 and calculates a predicted max continuation time Tcst of the coasting drive on the basis of vehicle speed V and a road gradient θ.

Processing thereafter proceeds to step 703 and calculates a predicted lower limit reaching time Tsoc for the SOC of the high-voltage battery 18 on the basis of a past behavior of the SOC of the high-voltage battery 18.

Processing thereafter proceeds to step 704 and determines whether the predicted max continuation time Tcst of the coasting drive is longer than the predicted lower limit reaching time Tsoc of the SOC of the high-voltage battery 18. When it is determined in step 704 that the predicted max continuation time Tcst is shorter than or equal to the predicted lower limit reaching time Tsoc, processing proceeds to step 709 to execute the normal auxiliary load control and operate the auxiliary load to be controlled normally.

On the other hand, when it is determined in step 704 that the predicted max continuation time Tcst is longer than the predicted lower limit reaching time Tsoc, processing proceeds to step 705 and calculates a predicted continuation time Tfv of the coasting drive while taking into consideration constraints of a vehicle ahead (such as the distance from the vehicle ahead and the speed relative to the vehicle ahead).

Processing thereafter proceeds to step 706 and determines whether the predicted continuation time Tfv of the coasting drive considering the constraints of the vehicle ahead is longer than the predicted lower limit reaching time Tsoc of the SOC of the high-voltage battery 18. When it is determined in step 706 that the predicted continuation time Tfv is shorter than or equal to the predicted lower limit reaching time Tsoc, processing proceeds to step 709 to execute the normal auxiliary load control and operate the auxiliary load to be controlled normally.

On the other hand, when it is determined in step 706 that the predicted continuation time Tfv is longer than the predicted lower limit reaching time Tsoc, processing proceeds to step 707 and calculates a predicted continuation time Tsig of the coasting drive while taking into consideration constraints of a road environment (such as the distance to each of a temporary stop and a railroad crossing, the distance to a traffic signal and the status of the traffic signal).

Processing thereafter proceeds to step 708 and determines whether the predicted continuation time Tsig of the coasting drive considering the constraints of the road environment is longer than the predicted lower limit reaching time Tsoc of the SOC of the high-voltage battery 18. When it is determined in step 708 that the predicted continuation time Tsig is shorter than or equal to the predicted lower limit reaching time Tsoc, processing proceeds to step 709 to execute the normal auxiliary load control and operate the auxiliary load to be controlled normally.

On the other hand, when it is determined in step 708 that the predicted continuation time Tsig is longer than the predicted lower limit reaching time Tsoc, processing proceeds to step 710 and executes the auxiliary load limit control on the basis of the determination that the SOC of the high-voltage battery 18 is highly likely to reach the allowable lower limit in the middle of the coasting drive. The auxiliary load limit control stops or reduces the electric power consumption of the auxiliary load to be controlled.

The routine of FIG. 14 is adapted to compare each of the predicted max continuation time Tcst, the predicted continuation time TN considering the constraints of the vehicle ahead, and the predicted continuation time Tsig considering the constraints of the road environment with the predicted lower limit reaching time Tsoc. Alternatively, however, the shortest duration among the predicted max continuation time Tcst, the predicted continuation time TN considering the constraints of the vehicle ahead, and the predicted continuation time Tsig considering the constraints of the road environment may be used as final predicted duration, in which case the auxiliary load limit control may be executed when the final predicted duration is longer than the predicted lower limit reaching time Tsoc.

The seventh embodiment described above is adapted to calculate the predicted duration of the coasting drive as well as the predicted lower limit reaching time of the SOC of the high-voltage battery 18 during the coasting drive and execute the auxiliary load limit control when the predicted duration of the coasting drive is longer than the predicted lower limit reaching time of the SOC of the high-voltage battery 18. As a result, the electric power supplied from the high-voltage battery 18 via the DC-DC converter 20 is stopped or reduced to be able to inhibit the decrease in the SOC of the high-voltage battery 8 and obtain the effect substantially similar to that of the first embodiment.

Note that while each of the first to third embodiments is adapted to execute the converter limit control when the SOC of the high-voltage battery is lower than or equal to the threshold during the coasting drive, the converter limit control may instead be executed when the SOC of the high-voltage battery is lower than or equal to the threshold during the execution of the power transmission interruption function (such as during the coasting drive or while the vehicle is stopped in a neutral state). The converter limit control may also be executed when the SOC of the high-voltage battery is lower than or equal to the threshold regardless of whether the power transmission interruption function is being executed or not.

While each of the fourth and fifth embodiments is adapted to execute the auxiliary load limit control when the SOC of the high-voltage battery is lower than or equal to the threshold during the coasting drive, the auxiliary load limit control may instead be executed when the SOC of the high-voltage battery is lower than or equal to the threshold during the execution of the power transmission interruption function (such as during the coasting drive or while the vehicle is stopped in the neutral state).

The sixth embodiment is adapted to execute the converter limit control when the predicted duration of the coasting drive is longer than the predicted lower limit reaching time of the SOC of the high-voltage battery during the coasting drive. Alternatively, however, the converter limit control may be executed when the predicted duration of the power transmission interruption function is longer than the predicted lower limit reaching time of the SOC of the high-voltage battery during the execution of the power transmission interruption function (such as during the coasting drive or while the vehicle is stopped in the neutral state).

The seventh embodiment is adapted to execute the auxiliary load limit control when the predicted duration of the coasting drive is longer than the predicted lower limit reaching time of the SOC of the high-voltage battery during the coasting drive. Alternatively, however, the auxiliary load limit control may be executed when the predicted duration of the power transmission interruption function is longer than the predicted lower limit reaching time of the SOC of the high-voltage battery during the execution of the power transmission interruption function (such as during the coasting drive or while the vehicle is stopped in the neutral state).

While each of the first to seventh embodiments is adapted to execute either the converter limit control or the auxiliary load limit control, the converter limit control and the auxiliary load limit control may both be executed.

In each of the first to seventh embodiments, the hybrid ECU is adapted to execute the converter control routine or the auxiliary load control routine. Alternatively, however, another ECU (such as at least one of an engine ECU, an MG-ECU, an air conditioner ECU, a power source ECU and the like) other than the hybrid ECU may execute the converter control routine or the auxiliary load control routine. Yet alternatively, the hybrid ECU and the other ECU may both execute the converter control routine or the auxiliary load control routine.

The present disclosure is not to be limited to the hybrid vehicle with the configuration illustrated in FIG. 1 but can be implemented while being applied to hybrid vehicles with various configurations equipped with the engine and the motor as the driving sources of the vehicle (such as a hybrid vehicle equipped with a plurality of motors), or can be implemented while being applied to a plug-in hybrid vehicle (PHV), a battery of which can be charged from a power source outside the vehicle.

The invention claimed is:

1. A control device for a hybrid vehicle including: an engine and a motor, each of which is mounted as a driving source; a generator driven by the engine; a high-voltage battery and a low-voltage battery, each of which is able to be charged and discharged; a converter connected between the high-voltage battery and the low-voltage battery; and an auxiliary load that consumes electric power supplied from the high-voltage battery via the converter or electric power supplied from the low-voltage battery, wherein the control device comprising:
   a control unit that executes converter limit control that stops the converter or reduces output of the converter when a state of charge of the high-voltage battery is lower than or equal to a predetermined threshold, wherein the control unit executes the converter limit control at a time of coasting drive on which the hybrid vehicle runs in a neutral state and the engine is stopped.

2. The control device according to claim 1, wherein the control unit executes the converter limit control when the state of charge of the high-voltage battery is lower than or equal to the threshold during execution of a power transmission interruption function by which power transmission between the driving source and a drive wheel is interrupted by the coasting drive.

3. The control device according to claim 1, wherein the control unit varies the converter limit control in accordance with a state of the low-voltage battery.

4. The control device according to claim 1, wherein the control unit varies the converter limit control in accordance with the state of charge of the high-voltage battery and a speed of the vehicle.

5. A control device for a hybrid vehicle including: an engine and a motor, each of which is mounted as a driving source; a generator driven by the engine; a high-voltage battery and a low-voltage battery, each of which is able to be charged and discharged; a converter connected between the high-voltage battery and the low-voltage battery; and a plurality of auxiliary loads, each of which consumes electric power supplied from the high-voltage battery via the converter or electric power supplied from the low-voltage battery, wherein the control device comprising:
   a control unit that executes auxiliary load limit control that stops at least one of the plurality of auxiliary loads or reduces electric power consumption of at least one of the plurality of auxiliary loads when a state of charge of the high-voltage battery is lower than or equal to a predetermined threshold, wherein
   the control unit executes the auxiliary load limit control at a time of coasting drive on which the hybrid vehicle runs in a neutral state and the engine is stopped, and
   the control unit executes the auxiliary load limit control during execution of a power transmission interruption function by which power transmission between the driving source and a drive wheel is interrupted by the coasting drive.

6. The control device according to claim 5, wherein the control unit varies the auxiliary load limit control in accordance with the state of charge of the high-voltage battery and a speed of the vehicle.

7. A control device for a hybrid vehicle including: an engine and a motor, each of which is mounted as a driving source; a generator driven by the engine; a high-voltage battery and a low-voltage battery, each of which is able be charged and discharged; a converter connected between the high-voltage battery and the low-voltage battery; and an auxiliary load that consumes electric power supplied from the high-voltage battery via the converter or electric power supplied from the low-voltage battery, wherein the control device comprising:
   a calculation unit that calculates predicted duration as well as a predicted lower limit reaching time during execution of a power transmission interruption function by which power transmission between the driving source and a drive wheel is interrupted by a coasting drive of the hybrid vehicle that runs in a neutral state, the predicted duration being a predicted value of time it takes for the execution of the power transmission interruption function to end, and the predicted lower limit reaching time being a predicted value of time it takes for a state of charge of the high-voltage battery to reach an allowable lower limit; and a control unit that executes converter limit control that stops the converter or reduces output of the converter when the predicted duration is longer than the predicted lower limit reaching time, wherein the control unit executes the converter limit control at a time of the coasting drive on which the hybrid vehicle runs in the neutral state and the engine is stopped.

8. A control device for a hybrid vehicle including: an engine and a motor, each of which is mounted as a driving source; a generator driven by the engine; a high-voltage battery and a low-voltage battery, each of which is able to be charged and discharged; a converter connected between the high-voltage battery and the low-voltage battery; and a plurality of auxiliary loads, each of which consumes electric power supplied from the high-voltage battery via the converter or electric power supplied from the low-voltage battery, wherein the control device comprising:

a calculation unit that calculates predicted duration as well as a predicted lower limit reaching time during execution of a power transmission interruption function by which power transmission between the driving source and a drive wheel is interrupted by a coasting drive of the hybrid vehicle that runs in a neutral state, the predicted duration being a predicted value of time it takes for the execution of the power transmission interruption function to end, and the predicted lower limit reaching time being a predicted value of time it takes for a state of charge of the high-voltage battery to reach an allowable lower limit; and a control unit that executes auxiliary load limit control that stops at least one of the plurality of auxiliary loads or reduces electric power consumption of at least one of the plurality of auxiliary loads when the predicted duration is longer than the predicted lower limit reaching time, wherein the control unit executes the auxiliary load limit control at a time of the coasting drive on which the hybrid vehicle runs in the neutral state and the engine is stopped.

9. The control device according to claim 7, wherein the calculation unit calculates the predicted duration, based on at least one of a speed of the vehicle, a road gradient, a constraint of a forward vehicle ahead the vehicle, and a constraint of a road environment.

10. The control device according to claim 7, wherein the calculation unit calculates the predicted lower limit reaching time, based on a past behavior of the state of charge of the high-voltage battery.

* * * * *